(12) United States Patent
Weder

(10) Patent No.: US 6,720,051 B2
(45) Date of Patent: *Apr. 13, 2004

(54) CLOTH-LIKE DECORATIVE SLEEVE

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 10/322,070

(22) Filed: Dec. 17, 2002

(65) Prior Publication Data

US 2003/0087050 A1 May 8, 2003

Related U.S. Application Data

(60) Division of application No. 09/690,611, filed on Oct. 17, 2000, now Pat. No. 6,565,958, which is a continuation-in-part of application No. 09/153,429, filed on Sep. 14, 1998, now abandoned, which is a continuation-in-part of application No. 09/098,898, filed on Jun. 17, 1998, now abandoned.
(60) Provisional application No. 60/050,867, filed on Jun. 26, 1997.

(51) Int. Cl.[7] .......................... B32B 1/02; B65B 11/00; B65B 25/02
(52) U.S. Cl. ......................... 428/35.7; 47/72; 53/397; 53/399; 53/411; 53/413; 53/416; 53/461; 53/465; 229/87.01; 229/87.04; 229/87.19; 428/156; 428/158; 428/172; 428/212; 428/213; 428/221
(58) Field of Search ..................... 53/397, 399, 411, 53/413, 416, 461, 465; 47/72; 229/87.01, 87.04, 87.19; 428/35.7, 156, 158, 172, 212, 213, 221

(56) References Cited

U.S. PATENT DOCUMENTS

| | | |
|---|---|---|
| 524,219 A | 8/1894 | Schmidt |
| 732,889 A | 7/1903 | Paver |
| 950,785 A | 3/1910 | Pene |

(List continued on next page.)

FOREIGN PATENT DOCUMENTS

| | | |
|---|---|---|
| AU | 4231978 | 6/1979 |
| BE | 654427 | 1/1965 |

(List continued on next page.)

OTHER PUBLICATIONS

Speed Cover Brochure, "The Simple Solution For Those Peak Volume Periods", Highland Supply Corporation, ©1989.

"Speed Sheets and Speed Rolls" Brochure, Highland Supply Corporation, ©1990.

(List continued on next page.)

Primary Examiner—Sandra M. Nolan
(74) Attorney, Agent, or Firm—Dunlap, Codding & Rogers, P.C.

(57) ABSTRACT

A plant package includes a flower pot containing a floral grouping and a sleeve having a texture and/or appearance simulating the texture and/or appearance of cloth, wherein the sleeve is formed of a flexible, laminated material having a texture and/or appearance simulating the texture and/or appearance of cloth. The sleeve includes a lower portion, which has a base portion and a skirt portion, and an upper portion which is detachable from the lower portion. The base, skirt and/or upper portion of the sleeve may be provided with a texture and/or appearance simulating the texture and/or appearance of cloth. A method for wrapping a floral grouping in a sleeve having a texture and/or appearance simulating the texture and/or appearance of cloth includes placing a floral grouping in the sleeve and binding the sleeve about a stem portion of the floral grouping via a bonding material disposed on the sleeve having a texture and/or appearance simulating the texture and/or appearance of cloth.

4 Claims, 9 Drawing Sheets

U.S. PATENT DOCUMENTS

| | | |
|---|---|---|
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake ............................ 229/87 |
| 1,863,216 A | 6/1932 | Wordingham |
| 1,978,631 A | 10/1934 | Herrlinger ...................... 91/68 |
| 2,048,123 A | 7/1936 | Howard ......................... 229/87 |
| RE21,065 E | 5/1939 | Copeman .......................... 93/2 |
| 2,170,147 A | 8/1939 | Lane ............................. 206/56 |
| 2,200,111 A | 5/1940 | Bensel ......................... 229/1.5 |
| 2,278,673 A | 4/1942 | Savada et al. ................. 154/43 |
| 2,302,259 A | 11/1942 | Rothfuss ........................ 41/10 |
| 2,323,287 A | 7/1943 | Amberg ......................... 229/53 |
| 2,355,559 A | 8/1944 | Renner ........................... 229/8 |
| 2,371,985 A | 3/1945 | Freiberg ....................... 206/46 |
| 2,411,328 A | 11/1946 | MacNab ......................... 33/12 |
| 2,510,120 A | 6/1950 | Leander ....................... 117/122 |
| 2,529,060 A | 11/1950 | Trillich ....................... 117/68.5 |
| 2,621,142 A | 12/1952 | Wetherell .................... 154/117 |
| 2,648,487 A | 8/1953 | Linda ........................... 229/55 |
| 2,688,354 A | 9/1954 | Berger ......................... 150/28 |
| 2,774,187 A | 12/1956 | Smithers ....................... 47/41 |
| 2,822,287 A | 2/1958 | Avery .......................... 117/14 |
| 2,846,060 A | 8/1958 | Yount .......................... 206/58 |
| 2,850,842 A | 9/1958 | Eubank, Jr. .................... 47/58 |
| 2,883,262 A | 4/1959 | Borin ........................... 21/56 |
| 2,989,828 A | 6/1961 | Warp .......................... 53/390 |
| 3,022,605 A | 2/1962 | Reynolds ........................ 47/58 |
| 3,080,680 A | 3/1963 | Reynolds ........................ 47/37 |
| 3,094,810 A | 6/1963 | Kalpin .......................... 47/37 |
| 3,121,647 A | 2/1964 | Harris et al. ................. 118/202 |
| 3,130,113 A | 4/1964 | Silman ......................... 161/97 |
| 3,271,922 A | 9/1966 | Wallerstein et al. ............. 53/3 |
| 3,322,325 A | 5/1967 | Bush ........................... 229/62 |
| 3,376,666 A | 4/1968 | Leonard ........................ 47/41 |
| 3,380,646 A | 4/1968 | Doyen et al. .................. 229/57 |
| 3,431,706 A | 3/1969 | Stuck .......................... 53/390 |
| 3,508,372 A | 4/1970 | Wallerstein et al. ............. 53/3 |
| 3,510,054 A | 5/1970 | Sanni et al. .................. 229/66 |
| 3,512,700 A | 5/1970 | Evans et al. .................. 229/53 |
| 3,552,059 A | 1/1971 | Moore ........................ 47/41.12 |
| 3,554,434 A | 1/1971 | Anderson ...................... 229/55 |
| 3,556,389 A | 1/1971 | Gregoire ...................... 229/53 |
| 3,557,516 A | 1/1971 | Brandt .......................... 53/14 |
| 3,620,366 A | 11/1971 | Parkinson ..................... 206/59 |
| 3,660,187 A | 5/1972 | Shortway et al. .............. 156/79 |
| 3,681,105 A | 8/1972 | Milutin ........................ 117/15 |
| 3,767,104 A | 10/1973 | Bachman et al. ............... 229/7 |
| 3,793,799 A | 2/1974 | Howe ........................... 53/32 |
| 3,869,828 A | 3/1975 | Matsumoto ................ 47/34.11 |
| 3,888,443 A | 6/1975 | Flanigen ..................... 248/152 |
| 3,911,187 A | 10/1975 | Raley ......................... 428/180 |
| 3,962,503 A | 6/1976 | Crawford ...................... 428/40 |
| 4,043,077 A | 8/1977 | Stonehocker ................... 47/66 |
| 4,054,697 A | 10/1977 | Reed et al. ................... 428/40 |
| 4,056,646 A | 11/1977 | Westfall et al. |
| 4,091,925 A | 5/1978 | Griffo et al. ................. 206/423 |
| 4,113,100 A | 9/1978 | Soja et al. ................... 206/602 |
| 4,118,890 A | 10/1978 | Shore ........................... 47/28 |
| 4,189,868 A | 2/1980 | Tymchuck et al. .............. 47/84 |
| 4,216,620 A | 8/1980 | Weder et al. ................... 47/72 |
| 4,248,347 A | 2/1981 | Trimbee ....................... 206/423 |
| D259,333 S | 5/1981 | Charbonneau ............... D9/306 |
| 4,265,049 A | 5/1981 | Gorewitz ....................... 47/26 |
| 4,277,427 A | 7/1981 | Kaminski et al. ........... 264/45.5 |
| 4,280,314 A | 7/1981 | Stuck .......................... 53/241 |
| 4,297,811 A | 11/1981 | Weder .......................... 47/72 |
| 4,333,267 A | 6/1982 | Witte ........................... 47/84 |
| 4,347,686 A | 9/1982 | Wood ........................... 47/73 |
| 4,359,442 A | 11/1982 | Cleminson et al. |
| 4,380,564 A | 4/1983 | Cancio et al. ............... 428/167 |
| 4,400,910 A | 8/1983 | Koudstall et al. .............. 47/84 |
| 4,413,725 A | 11/1983 | Bruno et al. .............. 206/45.33 |
| D279,279 S | 6/1985 | Wagner ..................... D11/143 |
| 4,546,875 A | 10/1985 | Zweber ....................... 206/82 |
| 4,621,733 A | 11/1986 | Harris ........................ 206/423 |
| 4,640,079 A | 2/1987 | Stuck ........................... 53/390 |
| 4,717,262 A | 1/1988 | Roen et al. .................. 383/120 |
| 4,733,521 A | 3/1988 | Weder et al. ................. 53/580 |
| 4,765,464 A | 8/1988 | Ristvedt ...................... 206/82 |
| 4,771,573 A | 9/1988 | Stengel ......................... 47/67 |
| 4,773,182 A | 9/1988 | Weder et al. ................. 47/72 |
| 4,801,014 A | 1/1989 | Meadows ................... 206/423 |
| 4,810,109 A | 3/1989 | Castel ........................ 383/105 |
| 4,835,834 A | 6/1989 | Weder ......................... 29/525 |
| D301,991 S | 7/1989 | Van Sant ................... D11/149 |
| 4,941,572 A | 7/1990 | Harris ........................ 206/423 |
| 4,980,209 A | 12/1990 | Hill ............................ 428/34.1 |
| 5,073,161 A | 12/1991 | Weder et al. ............... 493/154 |
| 5,074,675 A | 12/1991 | Osgood ...................... 383/122 |
| 5,105,599 A | 4/1992 | Weder ......................... 53/399 |
| 5,111,638 A | 5/1992 | Weder ......................... 53/397 |
| 5,120,382 A | 6/1992 | Weder ......................... 156/212 |
| 5,152,100 A | 10/1992 | Weder et al. .................. 47/72 |
| 5,181,364 A | 1/1993 | Weder ......................... 53/397 |
| D335,105 S | 4/1993 | Ottenwalder et al. ....... D11/164 |
| 5,199,242 A | 4/1993 | Weder et al. ................. 53/397 |
| 5,205,108 A | 4/1993 | Weder et al. ................. 53/397 |
| 5,228,234 A | 7/1993 | de Klerk et al. .......... 47/41.01 |
| 5,235,782 A | 8/1993 | Landau ......................... 47/72 |
| 5,239,775 A | 8/1993 | Landau ......................... 47/72 |
| 5,249,407 A | 10/1993 | Stuck .......................... 53/399 |
| 5,254,111 A | 10/1993 | Cancio et al. ........... 604/385.1 |
| 5,259,106 A | 11/1993 | Weder et al. ............... 29/469.5 |
| 5,296,184 A | 3/1994 | Wu et al. .................... 264/154 |
| 5,307,606 A | 5/1994 | Weder ......................... 53/410 |
| 5,315,785 A | 5/1994 | Avôt et al. ..................... 47/72 |
| 5,350,240 A | 9/1994 | Billman et al. .............. 383/104 |
| 5,353,575 A | 10/1994 | Stepanek ...................... 53/461 |
| 5,361,482 A | 11/1994 | Weder et al. ................. 29/469 |
| 5,388,386 A | 2/1995 | Weder ......................... 53/397 |
| 5,388,695 A | 2/1995 | Gilbert ....................... 206/423 |
| 5,428,939 A | 7/1995 | Weder et al. ................. 53/397 |
| 5,443,670 A | 8/1995 | Landau ....................... 156/191 |
| 5,448,875 A | 9/1995 | Weder ......................... 53/397 |
| 5,493,809 A | 2/1996 | Weder et al. .................. 47/72 |
| D368,025 S | 3/1996 | Sekerak et al. ............. D9/305 |
| 5,496,251 A | 3/1996 | Cheng ........................ 493/224 |
| 5,496,252 A | 3/1996 | Gilbert ....................... 493/224 |
| 5,526,932 A | 6/1996 | Weder ........................ 206/423 |
| 5,572,849 A | 11/1996 | Weder et al. ................. 53/399 |
| 5,572,851 A | 11/1996 | Weder ......................... 53/399 |
| 5,575,133 A | 11/1996 | Weder et al. ................. 53/397 |
| 5,617,703 A | 4/1997 | Weder ......................... 53/413 |
| 5,624,320 A | 4/1997 | Martinez ...................... 472/51 |
| 5,647,168 A | 7/1997 | Gilbert ......................... 47/72 |
| 5,661,951 A | 9/1997 | Weder ......................... 53/397 |
| 5,752,360 A | 5/1998 | Weder ......................... 53/397 |
| 5,974,736 A | 11/1999 | Weder ......................... 47/72 |
| 5,991,999 A | 11/1999 | Weder ....................... 29/469.5 |
| 6,324,813 B1 | 12/2001 | Weder ......................... 53/397 |
| 6,463,717 B1 | 10/2002 | Weder |
| 6,495,248 B1 | 12/2002 | Weder |

FOREIGN PATENT DOCUMENTS

| | | |
|---|---|---|
| CH | 560532 | 4/1975 |
| DE | 345464 | 12/1921 |
| DE | 513971 | 11/1930 |
| DE | 1166692 | 3/1964 |

| | | |
|---|---|---|
| DE | 1962947 | 6/1971 |
| DE | 2060812 | 11/1971 |
| DE | 2748626 | 5/1979 |
| DE | 3445799 | 6/1986 |
| DE | 3829281 | 5/1989 |
| DE | 3911847 | 10/1990 |
| EP | 0050990 | 5/1982 |
| EP | 0791543 | 8/1997 |
| FR | 1376047 | 9/1964 |
| FR | 2036163 | 12/1970 |
| FR | 2137325 | 12/1972 |
| FR | 2272914 | 12/1975 |
| FR | 2489126 | 3/1982 |
| FR | 2610604 | 8/1988 |
| FR | 2603159 | 3/1989 |
| FR | 2619698 | 3/1989 |
| GB | 5605 | of 1885 |
| GB | 1204647 | 9/1970 |
| GB | 2056410 | 3/1981 |
| GB | 2074542 | 11/1981 |
| GB | 2128083 | 4/1984 |
| GB | 2252708 | 8/1992 |
| IT | 224507 | 4/1996 |
| JP | 542958 | 2/1993 |
| NL | 8301709 | 12/1984 |
| NL | 1000658 | 1/1996 |
| WO | 9315979 | 8/1993 |

OTHER PUBLICATIONS

"Color Them Happy with Highlander Products" ©1992.
"Costa Keeps the Christmas Spirit", Supermarket Floral, Sep. 15, 1992.
"Super Seller", Supermarket Floral, Sep. 15, 1992.
"Halloween", Link Magazine, Sep. 1992.
"Now More Than Ever", Supermarket Floral, Sep. 15, 1992.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.
"Foil Jackets" brochure, Custom Medallion, Inc., Dec., 1996, 2 pages.
"Derwent Abstract" of FR 2610604A. It is noted that the abstract is an incorrect English translation of the contents of the French patent. The French patent does not enable or disclose adhesively attaching the covering to the container. 1988.
"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase.

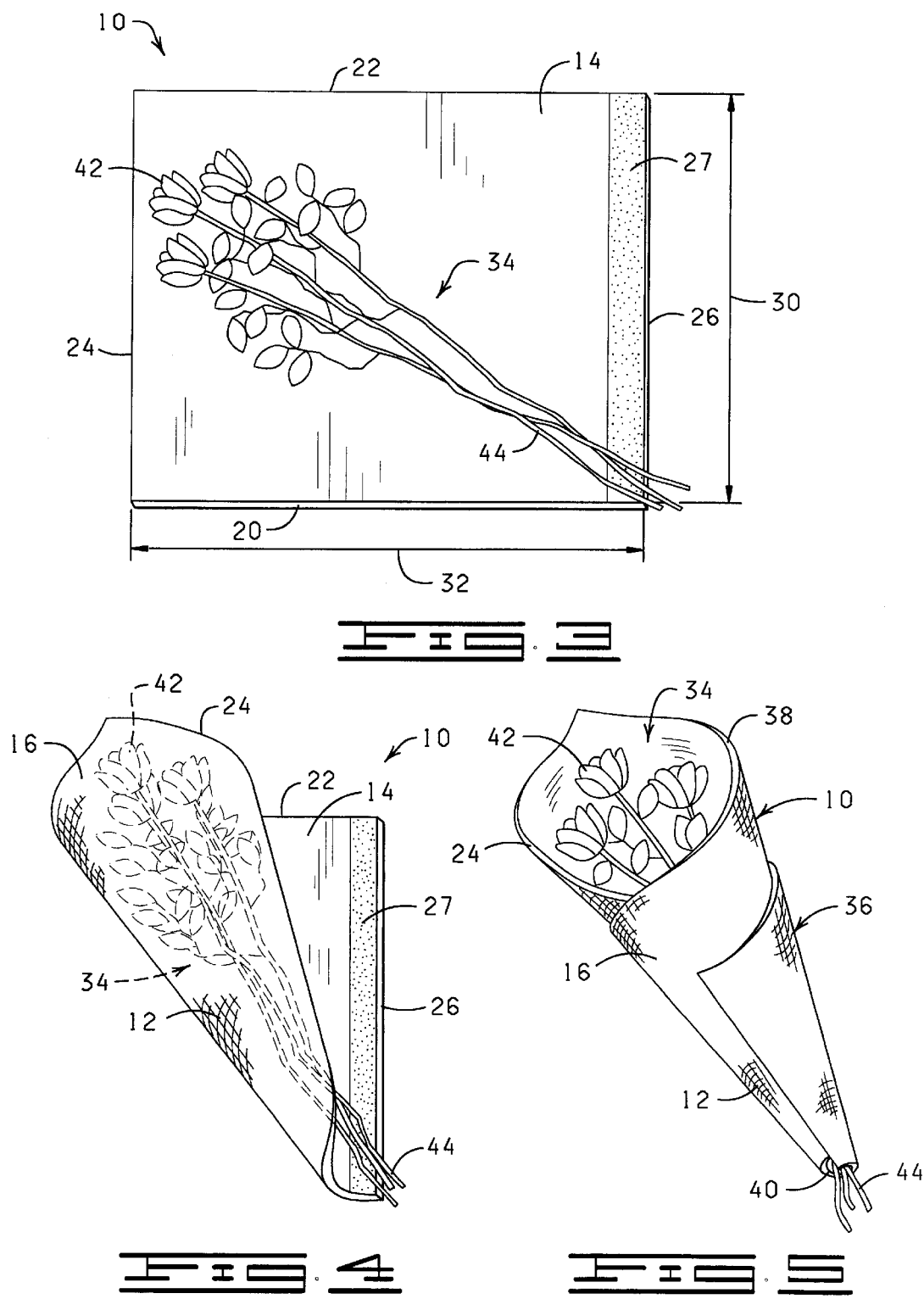

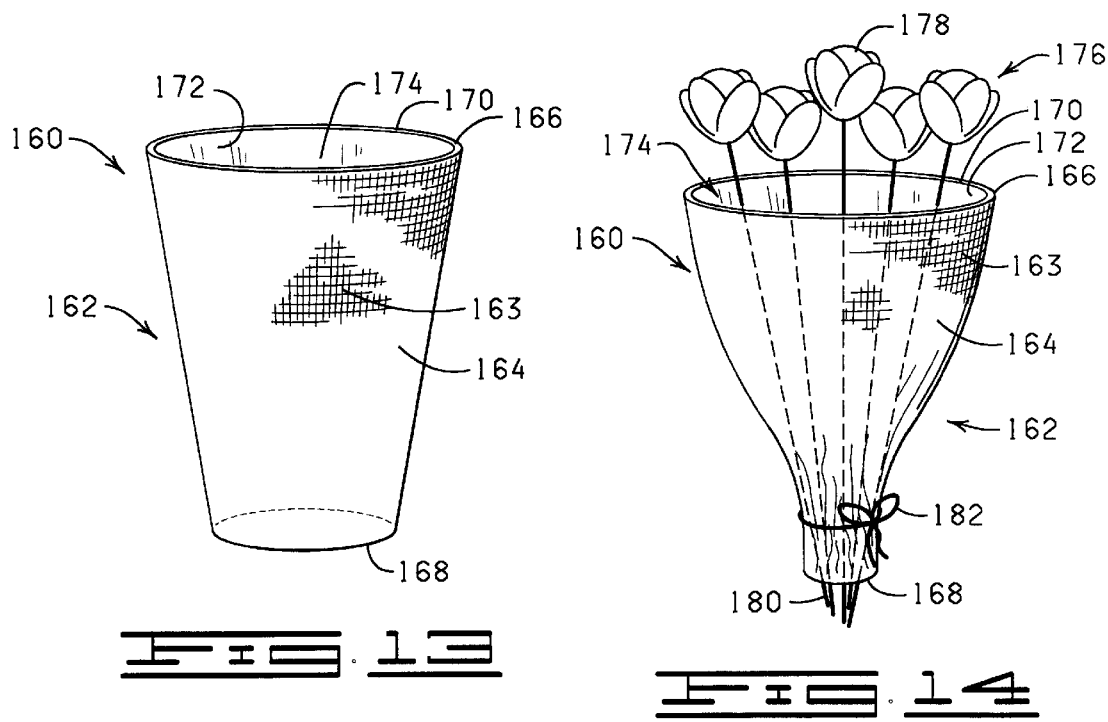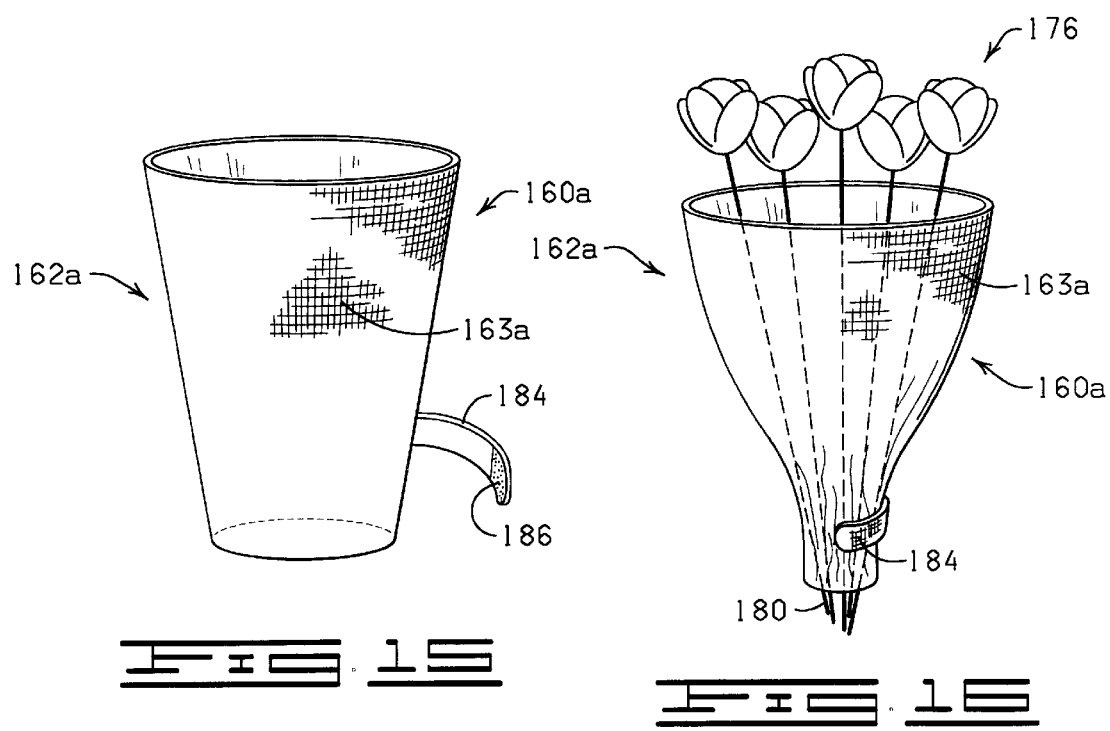

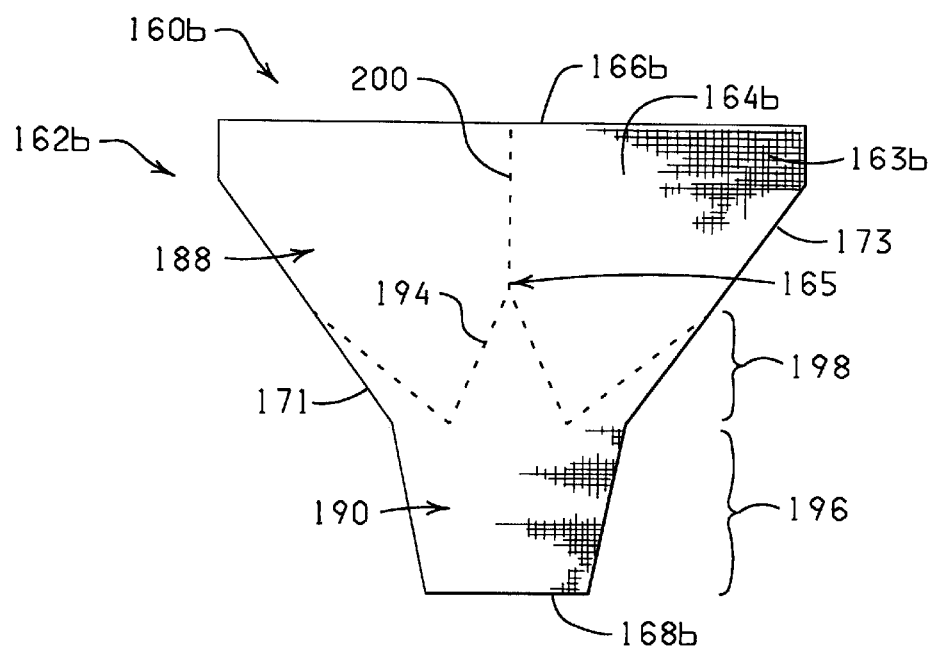
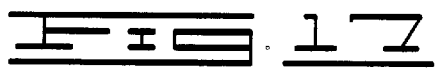
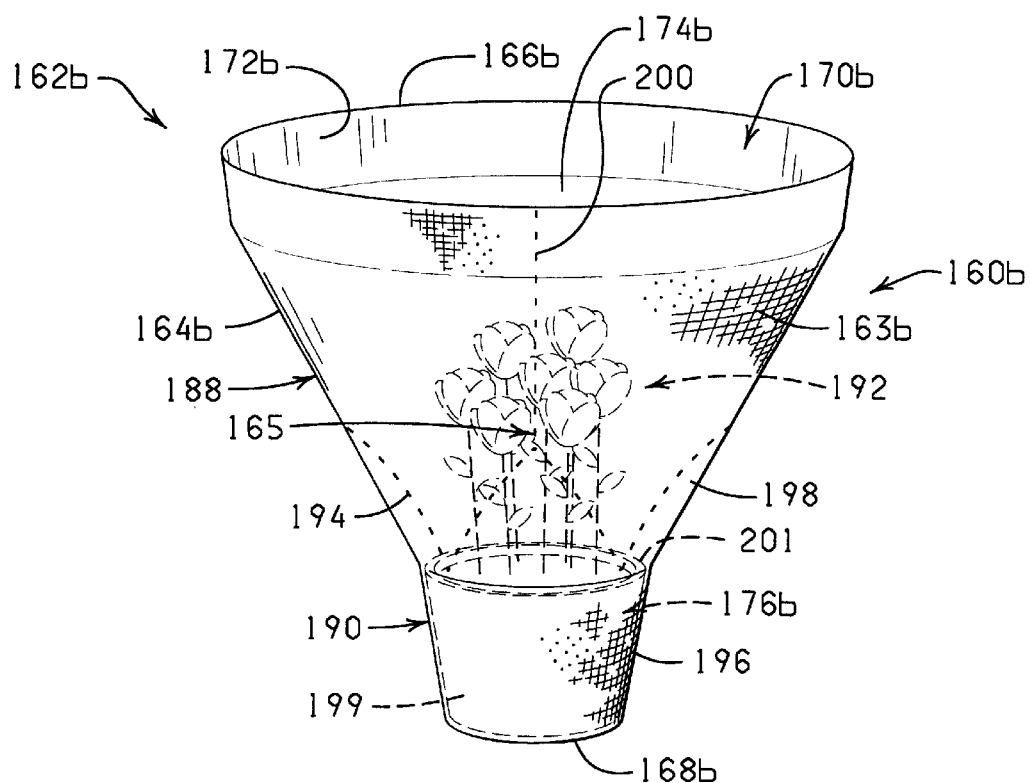
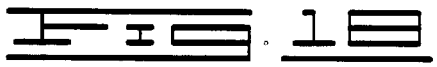

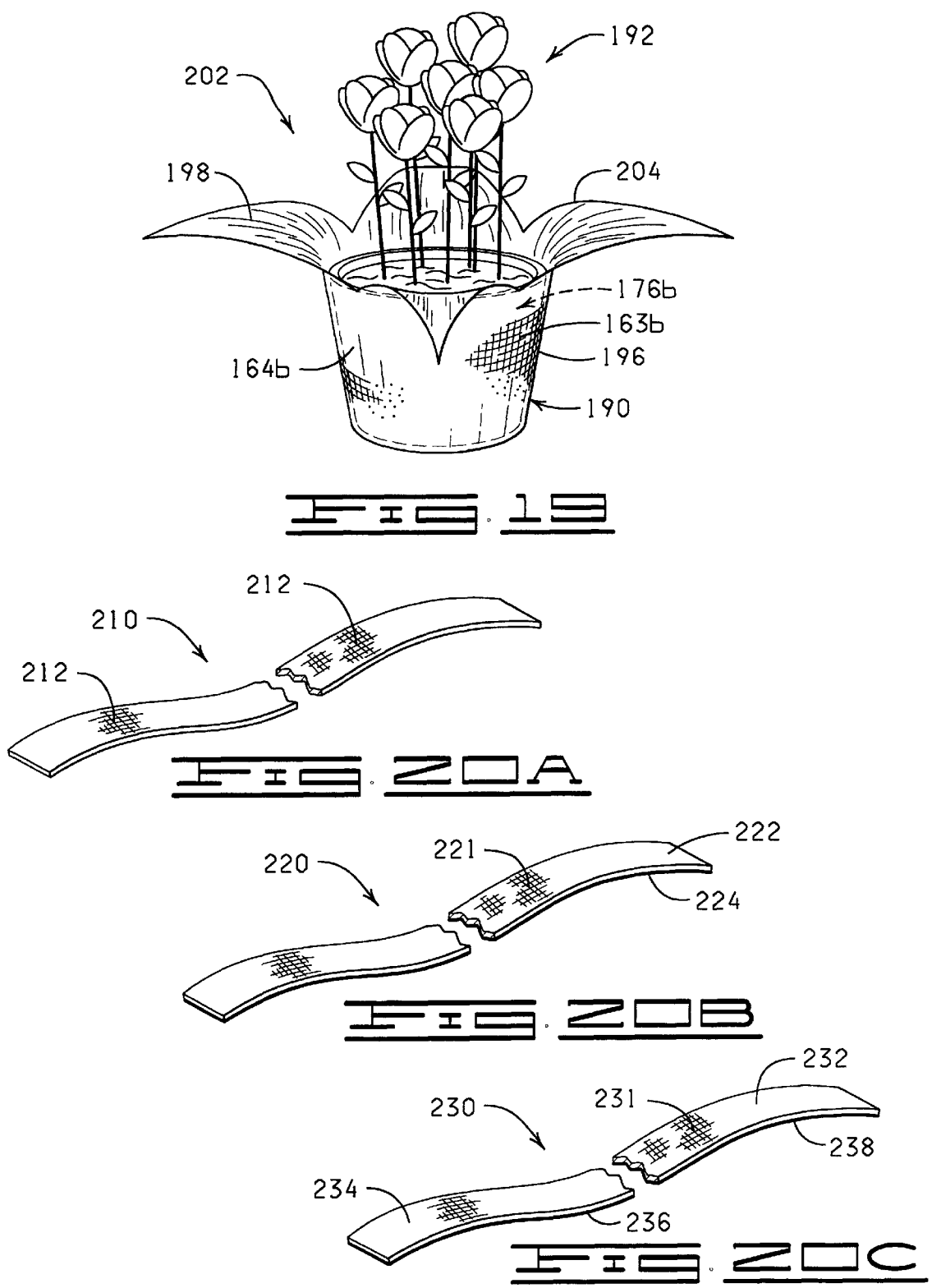

CLOTH-LIKE DECORATIVE SLEEVE

CROSS REFERENCE TO RELATED APPLICATIONS

This application is a divisional of U.S. Ser. No. 09/690,611, filed Oct. 17, 2000, now U.S. Pat. No. 6,565,958, issued May 20, 2003; which is a continuation-in-part of U.S. Ser. No. 09/153,429, filed Sep. 14, 1998, now abandoned; which is a continuation-in-part of U.S. Ser. No. 09/098,898 filed Jun. 17, 1998, now abandoned; which claims the benefit of provisional application U.S. Ser. No. 60/050,867, filed Jun. 26, 1997.

STATEMENT REGARDING FEDERALLY SPONSORED RESEARCH OR DEVELOPMENT

Not applicable.

FIELD OF THE INVENTION

The present invention relates to polymeric materials having a texture and/or appearance simulating the texture and/or appearance of cloth on a surface thereon, and more particularly but not by way of limitation, to flower pot covers, floral wrappings, and ribbon materials having a texture and/or appearance simulating the texture and/or appearance of cloth. In one aspect, the present invention relates to methods for producing flower pot covers and methods of wrapping floral groupings and flower pots with a sheet of polymeric material having a texture and/or appearance simulating the texture and/or appearance of cloth on a surface thereon to provide a decorative cover for such floral groupings and flower pots.

BRIEF DESCRIPTION OF THE DRAWINGS

FIG. 3 is a perspective view of the sheet of polymeric material having the texture and/or appearance simulating the texture and/or appearance of cloth on a surface thereof of FIG. 2 having a floral grouping disposed thereon.

FIG. 4 is a perspective view of the floral grouping of FIG. 3 being wrapped with the sheet of polymeric material having the texture and/or appearance simulating the texture and/or appearance of cloth on a surface thereof of FIG. 2 by one method of wrapping.

FIG. 5 is a perspective view of a decorative cover for the floral grouping formed from the sheet of polymeric material of FIG. 2 wherein the decorative cover has a conical configuration.

FIG. 13 is a perspective view of a floral sleeve formed from a sheet of polymeric material having a texture and/or appearance simulating the texture and/or appearance of cloth on a surface thereof.

FIG. 14 is a perspective view of the floral sleeve of FIG. 13 disposed about a floral grouping.

FIG. 15 is a perspective view of a floral sleeve having a cinching member wherein the floral sleeve is formed from a sheet of polymeric material having a texture and/or appearance simulating the texture and/or appearance of cloth on a surface thereof.

FIG. 16 is a perspective view of the floral sleeve of FIG. 15 disposed about a floral grouping.

FIG. 17 is an elevational view of a sleeve having a detachable upper portion wherein the sleeve is formed from a sheet of polymeric material having a texture and/or appearance simulating the texture and/or appearance of cloth on a surface thereof.

FIG. 18 is a perspective view of the sleeve of FIG. 17 having a flower pot disposed therein.

FIG. 19 is a perspective view of a flower pot disposed in the sleeve of FIG. 17 wherein the upper portion of the sleeve has been removed to provide a decorative cover having a skirt.

FIG. 20A is a perspective view of a polymeric ribbon material having a texture and/or appearance simulating the texture and/or appearance of cloth on a surface thereof.

FIG. 20B is a perspective view of a polymeric ribbon material having a texture and/or appearance simulating the texture and/or appearance of cloth and formed of an expanded core polymeric film.

FIG. 20C is a perspective view of a laminated polymeric ribbon wherein at least one surface of the laminated polymeric ribbon is modified or textured to provide the laminated polymeric ribbon with a texture and/or appearance simulating the texture and/or appearance of cloth.

DETAILED DESCRIPTION OF THE INVENTION

Description of FIGS. 1–8

Figure 1:
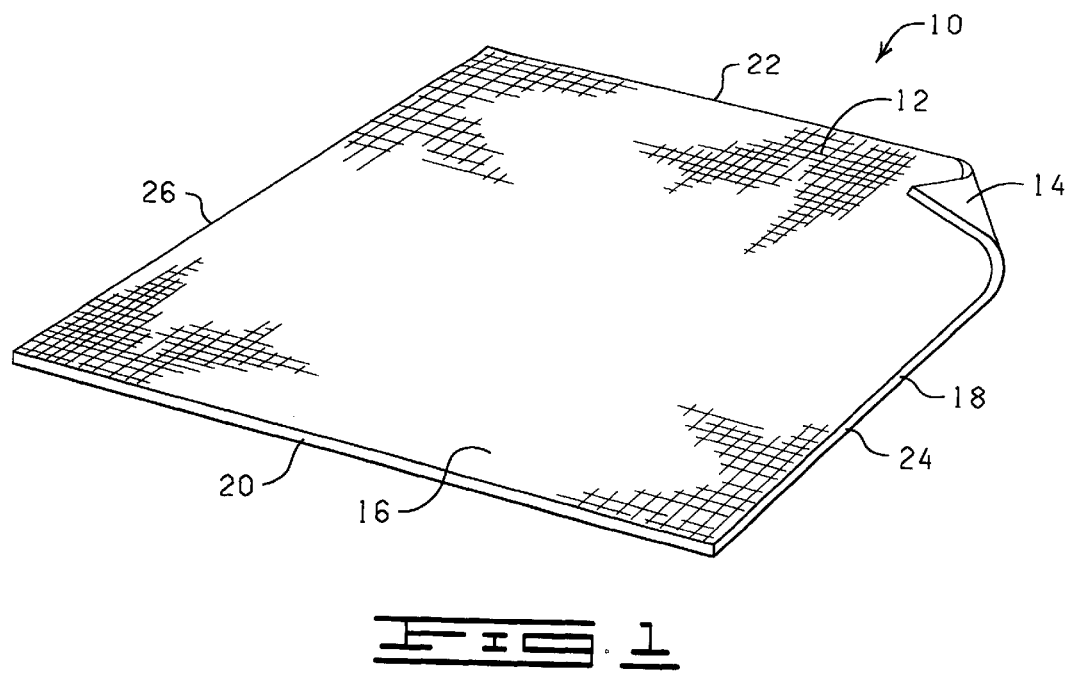
FIG. 1 is a perspective view of a sheet of polymeric material having a texture and/or appearance simulating the texture and/or appearance of cloth on a surface thereof constructed in accordance with the present invention, one corner of the sheet of polymeric material being turned upwardly.
Figure 2:
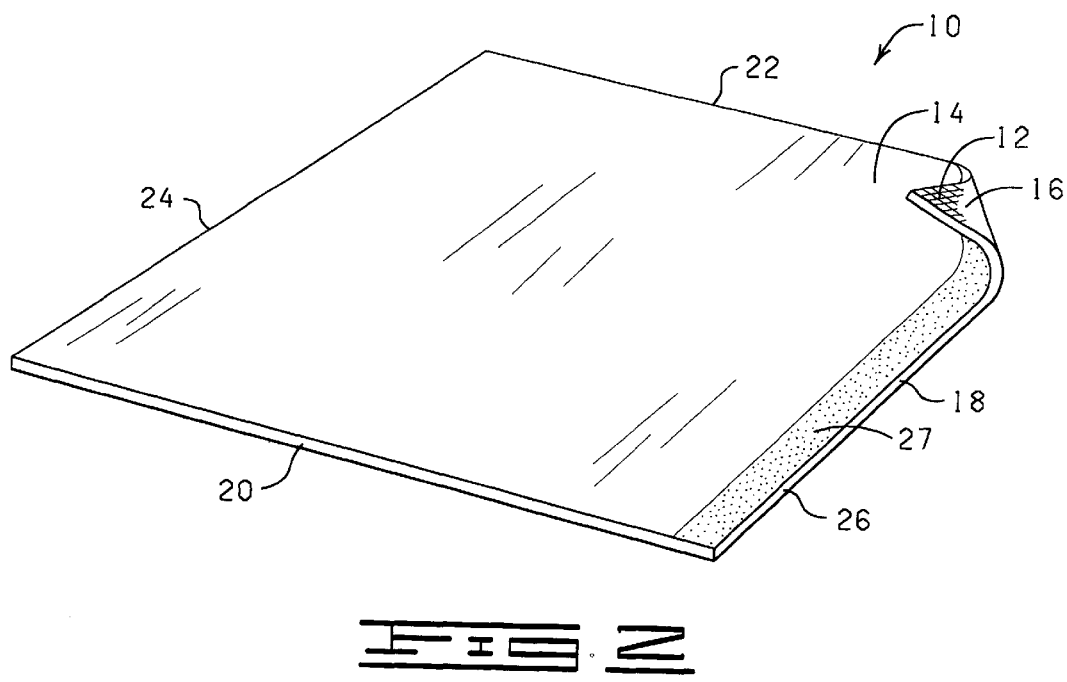
FIG. 2 is a perspective view of the sheet of polymeric material having the texture and/or appearance simulating the texture and/or appearance of cloth on a surface thereof of FIG. 1 having a bonding material disposed along one edge thereof, one corner of the sheet of polymeric material being turned upwardly.

Referring now to FIGS. 1 and 2, designated generally by the reference numeral 10 is a sheet or web of polymeric material having a texture and/or appearance 12 simulating the texture and/or appearance of cloth. That is, at least one surface of the sheet of polymeric material 10 has been modified to provide a matte or textured finish simulating the appearance and/or texture of cloth. The term "texture and/or appearance simulating the texture and/or appearance of cloth" may be used interchangeably with the terms "cloth-like finish", "cloth-like appearance", "finish simulating the appearance of cloth", "cloth-appearing textured or matte finish", "appearance of being fabricated of cloth" and "textured or matted surface simulating cloth".

The term "appearance or texture simulating the appearance or texture of cloth" as used herein will be understood to include textures and/or appearances and/or surface modifications of a polymeric material such that the polymeric material is provided with at least one surface thereof which simulates the texture and/or appearance of a woven material, a nonwoven material, a welded material, a spun bonded material, or a knitted or pressed fabric of fibrous material. The term "texture and/or appearance simulating the texture and/or appearance of cloth" as used herein will also be understood to include textures and/or appearances simulating the texture and/or appearance of cotton, wool, silk, hair, burlap, and linen, as well as synthetic fibers such as rayon and polyester, and blends thereof, such as denim. While different types of cloth have been disclosed hereinabove, it will be understood that a polymeric material having at least one surface thereof modified such that the surface is provided with a texture and/or appearance simulating the texture and/or appearance of cloth of the present invention will not be limited to appearances simulating the types of cloth described herein, and the texture and/or appearance may simulate other types of cloth which fall within the scope of the invention.

The modification of the sheet of polymeric material 10 to provide the sheet of polymeric material with a texture and/or appearance 12 simulating the texture and/or appearance of cloth can be accomplished in several ways. For example, a matte finish simulating the appearance of cloth can be provided by printing a desired pattern on the sheet of polymeric material and thereafter laminating a matte material, such as a translucent polymeric film, over the printed pattern. To further enhance the texture and/or appearance 12 simulating the texture and/or appearance of cloth of the sheet of polymeric material 10, the matte material may or may not have a plurality of spatially disposed holes extending there through. A matte or textured finish simulating the texture and/or appearance of cloth can also be produced by printing a sheet of polymeric material with a matted (i.e. dull finish) ink, by lacquering at least one surface of the sheet of polymeric material with a dull finish lacquer or a matting lacquer, by embossing the sheet of polymeric material to provide an embossed pattern simulating the weave or texture of cloth, or by embossing and printing the sheet of polymeric material to provide embossed and printed patterns wherein the embossed and printed patterns may be in registry, out of registry, or wherein a portion of the embossed and printed patterns are in registry and a portion of the embossed and printed patterns are out of registry. In addition, a matte or textured finish capable of providing the sheet of polymeric material with the texture and/or appearance 12 simulating the texture and/or appearance of cloth can be achieved by extruding a polymeric resin onto a matted or textured chill roll, by laminating a second sheet of material to the sheet of polymeric material, or by application of a foamable lacquer or foamable ink.

The sheet of polymeric material 10 having the texture and/or appearance 12 simulating the texture and/or appearance of cloth has an upper surface 14, a lower surface 16, and an outer peripheral edge 18. At least one surface of the sheet of polymeric material 10, such as the lower surface 16, is matted or textured as described above to provide the sheet of polymeric material 10 with the texture and/or appearance 12 simulating the texture and/or appearance of cloth. The outer peripheral edge 18 of the sheet of polymeric material 10 comprises a first side 20, a second side 22, a third side 24, and a fourth side 26. A bonding material 27 (FIG. 2) may be disposed on at least a portion of one or both surfaces of the sheet of material 10, such as the upper surface 14 thereof as shown and as further illustrated in U.S. Pat. No. 5,181,364 entitled "Wrapping A Floral Grouping With Sheets Having Adhesive or Cohesive Material Applied Thereto", issued to Weder on Jan. 26, 1993, the specification of which is hereby expressly incorporated by reference herein.

The sheet of polymeric material 10 having the texture and/or appearance 12 simulating the texture and/or appearance of cloth may be employed to provide a decorative cover for a floral grouping (FIGS. 3 through 6) or a decorative cover for a flower pot (FIG. 7); or to form a preformed flower pot cover for covering a flower pot (FIGS. 10 and 11); or to provide a sleeve for wrapping or covering a floral grouping (FIGS. 13 through 16) or a flower pot (FIGS. 17 through 19); or to provide a ribbon material having a texture and/or appearance simulating the texture and/or appearance of cloth (FIGS. 20A through 20C). The use of the sheet of polymeric material 10 having the texture and/or appearance 12 simulating the texture and/or appearance of cloth to form a decorative cover for a floral grouping or a flower pot, or to form a sleeve for a floral grouping or a flower pot, or to form a preformed flower pot cover, or as a ribbon material will be described in more complete detail herein.

As noted above, the sheet of polymeric material 10 having the texture and/or appearance 12 simulating the texture and/or appearance of cloth can be utilized to form a decorative cover for a floral grouping or a flower pot. The term "flower pot" as used herein refers to any type of container for holding a floral grouping, or a plant, or even another pot-type container. Examples of flower pots and/or pot-type containers include, but are not limited to, clay pots, wooden pots, plastic pots, pots made from natural and/or synthetic fibers, or any combination thereof. Such flower pots and/or pot-type containers are provided with a retaining space for receiving a floral grouping. The floral grouping may be disposed within the retaining space of the flower pot with a suitable growing medium described in further detail below, or other retaining medium, such as a floral foam. It will also be understood that in some cases the floral grouping, and any appropriate growing medium or other retaining medium, may be disposed in a sleeve formed from the sheet of material 10 if the sleeve is adapted to contain a medium.

"Floral grouping" as used herein refers to cut fresh flowers, artificial flowers, a single flower or other fresh and/or artificial plants or other floral materials and may include other secondary plants and/or ornamentation or artificial or natural materials which add to the aesthetics of the overall floral grouping. Further, the floral grouping may comprise a growing potted plant having a root portion as well. However, it will be appreciated that the floral grouping may consist of only a single bloom or only foliage, or a botanical item (not shown), or a propagule. The term "floral grouping" may be used interchangeably herein with the term "floral arrangement". The term "floral grouping" may also be used interchangeably herein with the terms "botanical item" and/or "propagule."

The term "growing medium" when used herein refers to any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein includes a natural or artificial herbaceous or woody plant, taken singularly or in combination. The term "botanical item" also includes any portion or portions of natural or artificial herbaceous or woody plants including stems, leaves, flowers, blossoms, buds, blooms, cones, or roots, taken singularly or in combination, or in groupings of such portions such as bouquets or floral groupings.

The term "propagule" when used herein refers to any structure capable of being propagated or acting as an agent of reproduction including seeds, shoots, stems, runners, tubers, plants, leaves, roots or spores.

In the embodiments shown in the drawings, the sheet of polymeric material 10 having the texture and/or appearance 12 simulating the texture and/or appearance of-cloth is square. It will be appreciated, however, that the sheet of polymeric material 10 having the texture and/or appearance 12 simulating the texture and/or appearance of cloth can be of any shape, configuration or size as long as the sheet of polymeric material 10 is sufficiently sized and shaped to wrap and encompass a floral grouping or a flower pot. For example, the sheet of polymeric material 10 may have a rectangular, round, oval, octagonal or asymmetrical shape. Further, multiple sheets of the polymeric material 10 may be used in a single circumstance to provide a decorative cover or sleeve for a floral grouping or a flower pot. Moreover, when multiple sheets of the polymeric material 10 having the texture and/or appearance 12 simulating the texture and/or appearance of cloth are used in combination, the sheets of polymeric material 10 need not be uniform in size or shape. Finally, it will be appreciated that the sheet of polymeric material 10 having the texture and/or appearance 12 simulating the texture and/or appearance of cloth shown herein is a substantially flat sheet except for the texturing, matting, embossing, flocking, application of a foamable lacquer or foamable ink, or other treatments and techniques employed to provide the sheet of polymeric material 10 with the desired texture or matting so that the sheet of polymeric material 10 has the appearance of cloth.

Any thickness or stiffness of the sheet of polymeric material 10 may be utilized in accordance with the present invention as long as the sheet of polymeric material 10 can be modified to provide the sheet of polymeric material 10 with the texture and/or appearance 12 simulating the texture and/or appearance of cloth and the sheet of material polymeric 10 having the texture and/or appearance 12 simulating the texture and/or appearance of cloth can be wrapped about at least a portion of a floral grouping or a flower pot, as described herein. Generally, the sheet of polymeric material 10 will have a thickness of from about 0.1 mil to about 30 mil, and more desirably from about 0.5 mil to about 10 mil.

The terms "polymer film", "polymeric film" and "polymeric material" when used herein refers to a synthetic polymer such as a polypropylene, a naturally occurring polymer such as cellophane, an extruded polymeric material having an expanded core such as extruded polypropylene having an expanded core and combinations thereof. The extruded polymeric material having an expanded core may also be referred to herein as an expanded core polymeric material.

"Extruded polymeric material having an expanded core" or "expanded core polymeric film" as used herein refers to any extrudable polymeric material or polymeric film in which the core is expanded during extrusion, such as by incorporation of a blowing agent in the polymeric resin being extruded.

The sheet of polymeric material 10 may also be constructed, in whole or in part, from a cling material. "Cling material" when used herein refers to any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a flower pot. This connecting engagement is preferably temporary in that the material may be easily removed, i.e., the cling material "clings" to the flower pot.

The cling material is constructed from polyethylene such as Cling Wrap made by Glad®, First Brands Corporation, Danbury, Conn., and the cling material may be treated if necessary. The thickness of the cling material will, in part, depend upon the size of sleeve and the size of the flower pot in the sleeve, i.e., generally, a larger flower pot may require a thicker and therefore stronger cling material. The cling material will range in thickness from about 0.1 mil to about 10 mil, and more desirably from about 0.5 mil to about 2.5 mil. However, any thickness of cling material may be utilized in accordance with the present invention which permits the cling material to be modified as hereinbefore described to provide the cling material with a texture and/or appearance simulating the texture and/or appearance of cloth.

Figure 9A:
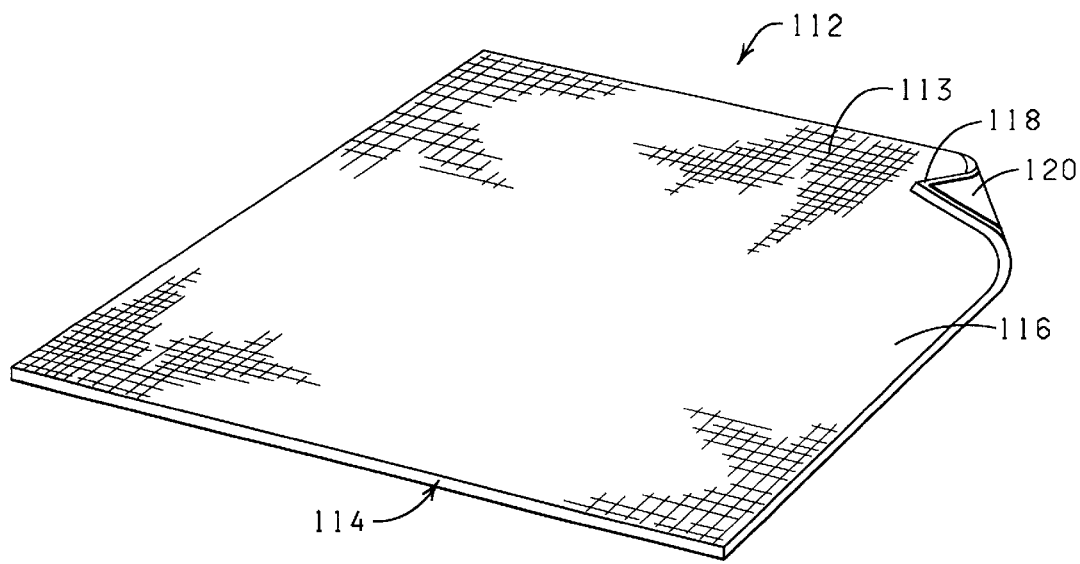
FIG. 9A is a perspective view of a sheet of expanded core polymeric film having a texture and/or appearance simulating the texture and/or appearance of cloth on a surface thereof wherein an acrylic heat sealable lacquer is disposed on at least one surface thereof, one corner of the sheet of expanded core polymeric film being upwardly turned.
Figure 9B:
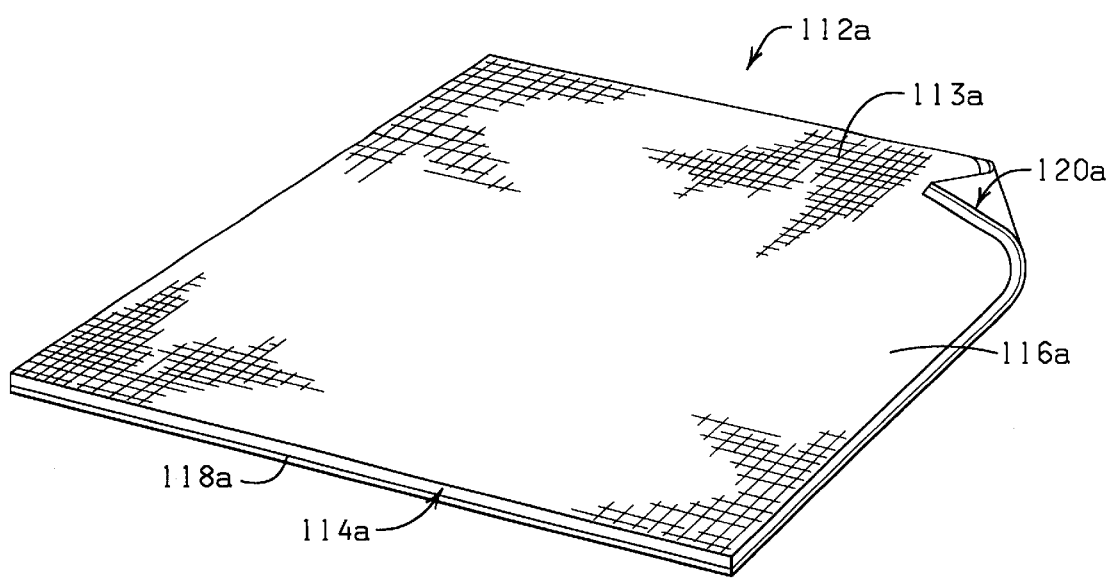
FIG. 9B is a perspective view of a laminated sheet of material wherein one surface thereof is modified or textured to provide the sheet of laminated material with the texture and/or appearance simulating the texture and/or appearance of cloth on a surface thereof, one corner of the laminated sheet of material being upwardly turned.

A decorative cover for a floral grouping (FIGS. 3 through 6), or a decorative cover for a flower pot (FIG. 7), or a decorative preformed flower pot cover for covering a flower pot (FIGS. 10 and 11), or a sleeve for wrapping or covering a floral grouping (FIGS. 13 through 16) or a flower pot (FIGS. 17 through 19), or a ribbon material (FIGS. 20A through 20C) may also be constructed of a laminated material having a texture and/or appearance simulating the texture and/or appearance of cloth (FIG. 9B). The laminated material having a texture and/or appearance simulating the texture and/or appearance of cloth can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) to paper, metallized foil and combinations thereof and the like wherein at least one surface of the laminated material is textured or modified to simulate the weave or texture of cloth. The only requirements in using a laminated material having a texture and/or appearance simulating the texture and/or appearance of cloth to form a decorative cover for a floral grouping, or a decorative cover for a flower pot, or a preformed flower pot cover for covering a flower pot, or a sleeve for wrapping or covering a floral grouping or a flower pot, or as ribbon material in accordance with the present invention are that at least one surface of the laminated material be capable of being modified to provide the laminated material with at least one surface having a texture and/or appearance simulating the texture and/or appearance of cloth, and that the laminated material be sufficiently flexible or pliable to permit the laminated material to be formed into a decorative cover for a floral grouping, or a decorative cover for a flower pot, or a decorative preformed flower pot cover for covering a flower pot, or a sleeve for wrapping or covering a floral grouping or a flower pot, or to be used as ribbon material. It should also be noted that two or more separate sheets of material can be used to form any of the above described embodiments, as long as one of the sheets of material is modified or textured to provide same with a texture and/or appearance simulating the texture and/or appearance of cloth.

The sheet of polymeric material 10 or a laminated material (FIG. 9B) having a texture and/or appearance simulating the texture and/or appearance of cloth may vary in color. Further, the sheet of polymeric material 10 or a laminated material may comprise other decorative patterns or designs in addition to the matting, texturing, flocking, application of foamable lacquers or foamable inks, or embossing employed to impart the texture and/or appearance 12 simulating the texture and/or appearance of cloth to the sheet of polymeric material 10 or the laminated material.

As illustrated in FIG. 3, the sheet of polymeric material 10 has a width 30 extending generally between the first side 20 and the second side 22, respectively, sufficiently sized whereby the sheet of polymeric material 10 can be wrapped about and encompass a floral grouping or a flower pot. The sheet of polymeric material 10 has a length 32 extending generally between the third side 24 and the fourth side 26, respectively, sufficiently sized whereby the sheet of polymeric material 10 extends over a substantial portion of the floral grouping when the sheet of polymeric material 10 has been wrapped about the floral grouping in accordance with the present invention, as described in detail herein. The sheet of polymeric material 10 may also be wrapped about a flower pot to substantially wrap and cover the flower pot in accordance with the present invention.

A plurality of sheets of polymeric material 10 having the texture and/or appearance 12 simulating the texture and/or appearance of cloth may be connected together to form a roll as is shown in U.S. Pat. No. 5,459,976, issued Oct. 24, 1995 to Weder et al, entitled "MATERIAL AND ADHESIVE STRIP DISPENSER", the specification of which is hereby expressly incorporated in its entirety by reference herein.

FIGS. 3–5 illustrate the use of the sheet of polymeric material 10 having the texture and/or appearance 12 simulating the texture and/or appearance of cloth to wrap a floral grouping 34 to provide a decorative cover 36 (FIG. 5) for the floral grouping 34, wherein the decorative cover 36 has an open upper end 38 and a lower end 40. The sheet of polymeric material 10 may optionally have the strip of bonding material 27 disposed upon the upper surface 14 and/or the lower surface 16 thereof, such as the strip of bonding material 27 disposed along at least a portion of the upper surface 14 of the sheet of polymeric material 10 so as to be disposed substantially adjacent the fourth side 26 thereof, substantially as shown in FIGS. 3 and 4. Further, the sheet of polymeric material 10 having the texture and/or appearance 12 simulating the texture and/or appearance of cloth can be provided either as an individual sheet or from a pad or roll of material.

The bonding material 27, if present, may have a backing or release strip (not shown). The backing or release strip may be left applied for a period of time to the bonding material 27 after it is disposed on a surface of the sheet of polymeric material 10 prior to its use as a wrapping material, to protect the bonding qualities of the bonding strip. In operation, an operator may dispose the sheet of polymeric material 10 having the texture and/or appearance 12 simulating the texture and/or appearance of cloth on a support surface (not shown) such that the lower surface 16 of the sheet of polymeric material 10 (which has been modified to provide the sheet of polymeric material 10 with the texture and/or appearance 12 simulating the texture and/or appearance of cloth) is in contact with the support surface.

Referring more specifically to FIGS. 3–5, the floral grouping 34 is placed upon the upper surface 14 of the sheet of polymeric material 10 in a diagonal orientation. The floral grouping 34 has an upper bloom or foliage portion 42 and a lower stem portion 44. The sheet of polymeric material 10 is then wrapped about the floral grouping 34 by the operator (FIGS. 4 and 5), the operator overlapping a portion of the sheet of polymeric material 10 over another portion of the sheet of polymeric material 10. That is, for example, the operator places the first side 20 of the sheet of polymeric material 10 over the floral grouping 34, as shown in FIG. 4. The operator rolls the floral grouping 34 and the sheet of polymeric material 10 in the direction toward the second side 22 of the sheet of polymeric material 10 (FIG. 4) until the upper surface 14 near second side 22 firmly engages the lower surface 16 of the sheet of polymeric material 10, wherein the floral grouping 34 is substantially encompassed by the sheet of polymeric material 10, and wherein the bonding material 27 contacts the lower surface 16 of the sheet of polymeric material 10 to provide the decorative cover 36 (FIG. 5) having the texture and/or appearance 12 simulating the texture and/or appearance of cloth which substantially encompasses and surrounds a substantial portion of the floral grouping 34. FIG. 5 shows the floral grouping 34 wrapped in a conical fashion to provide the decorative cover 36 for the floral grouping 34 which has the appearance 12 of being fabricated of cloth. When the floral grouping 34 is wrapped in a conical fashion, the bloom portion 42 of the floral grouping 34 is disposed adjacent the open upper end 38 of the decorative cover 36, and the stem portion 44 of the floral grouping 34 is disposed adjacent the lower end 40 of the decorative cover 36.

Figure 6:
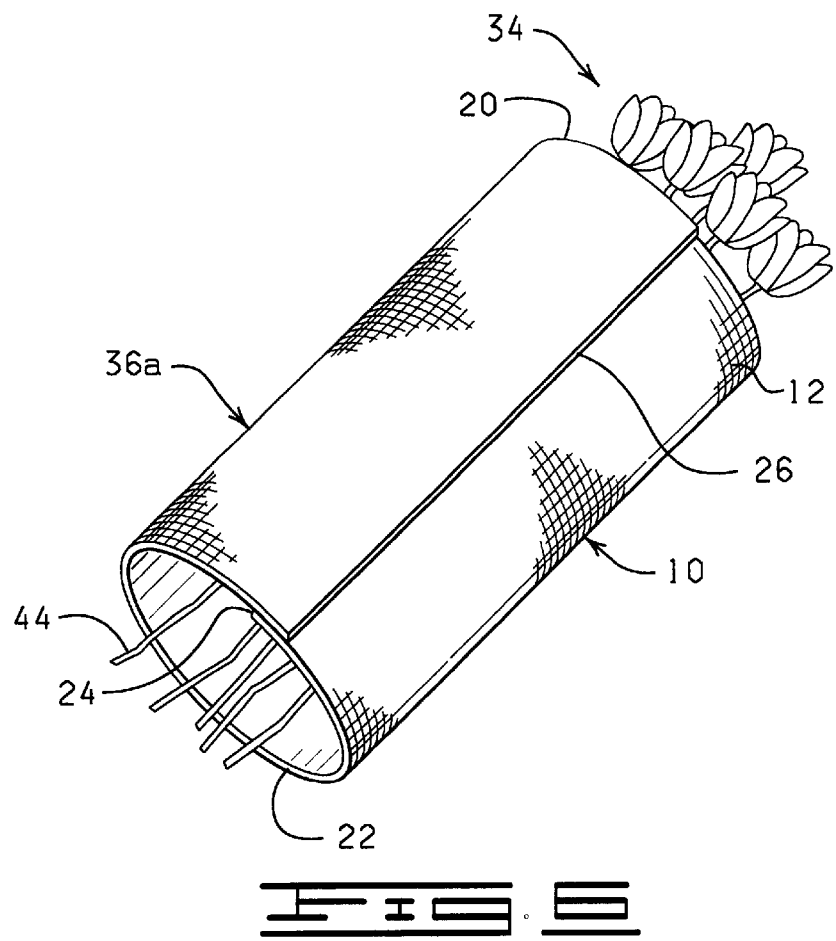
FIG. 6 is a perspective view of a decorative cover for a floral grouping wherein the decorative cover has a substantially cylindrical configuration.

In another embodiment, illustrated in FIG. 6, the sheet of polymeric material 10 having the texture and/or appearance 12 simulating the texture and/or appearance of cloth is utilized to wrap the floral grouping 34 in a cylindrical fashion. The floral grouping 34 is disposed upon the sheet of polymeric material 10 approximately parallel to the third side 24 of the sheet of polymeric material 10. The sheet of polymeric material 10 is wrapped generally about the stem portion 44 of the floral grouping 34 to a position wherein the fourth side 26 of the sheet of polymeric material 10 generally overlaps the third side 24 of the sheet of polymeric material 10 in a cylindrical fashion. It should be noted that the sheet of polymeric material 10 may be wrapped a plurality of times about the stem portion 44 of the floral grouping 34 before the overlapping of the third and fourth sides 24 and 26 of the sheet of polymeric material 10. As before, the portion of the sheet of polymeric material 10 near the fourth side 26 is disposed generally adjacent another portion of the sheet of polymeric material 10, and the two adjacent portions then are brought into contact where they may be bondingly engaged, thereby securing the sheet of polymeric material 10 generally about the floral grouping 34 so as to provide a decorative cover 36a for the floral grouping 34 which has the appearance 12 of being fabricated of cloth.

Figure 7:
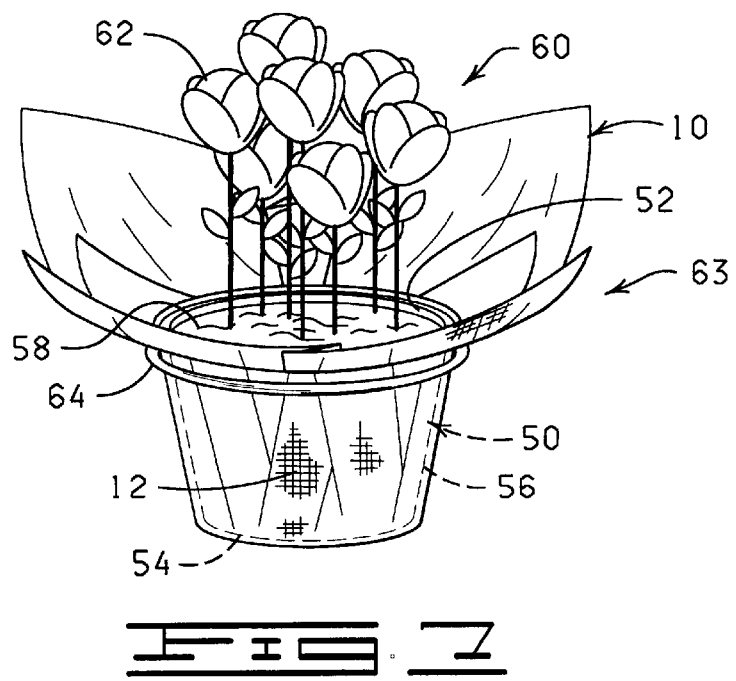
FIG. 7 is a perspective view of a decorative cover positioned about a flower pot wherein the decorative cover is formed from the sheet of polymeric material having the texture and/or appearance simulating the texture and/or appearance of cloth on a surface thereof of FIG. 1.

In another version of the invention, the sheet of polymeric material 10 having the texture and/or appearance 12 simulating the texture and/or appearance of cloth may be used to wrap a flower pot or pot-type container, as noted above. Shown in FIG. 7 is a flower pot designated by the reference numeral 50 having an open upper end 52, a bottom end 54, an outer peripheral surface 56, an inner retaining space 58 within which may be disposed a growing medium. The flower pot 50 may contain a botanical item, such as a plant 60, which has an upper portion 62 comprising blooms or foliage or both.

The sheet of polymeric material 10 having the texture and/or appearance 12 simulating the texture and/or appearance of cloth may be wrapped about the flower pot 50 by any one of numerous methods used to wrap sheets of material about flower pots to form decorative pot covers for flower pots, such as a decorative cover 63 having the texture and/or appearance 12 simulating the texture and/or appearance of cloth disposed about the flower pot 50, as illustrated in FIG. 7. The sheet of polymeric material 10 may, for example, be formed by hand about the outer peripheral surface 56 of the flower pot 50 to produce the decorative cover 63 which has the appearance 12 of being fabricated of cloth. The decorative cover 63 can then be secured about the flower pot 50 by a bonding material or by an elastic band 64 such that the open upper end 52 of the flower pot 50 remains substantially uncovered by the decorative cover 63, substantially as shown in FIG. 7.

Figure 8:
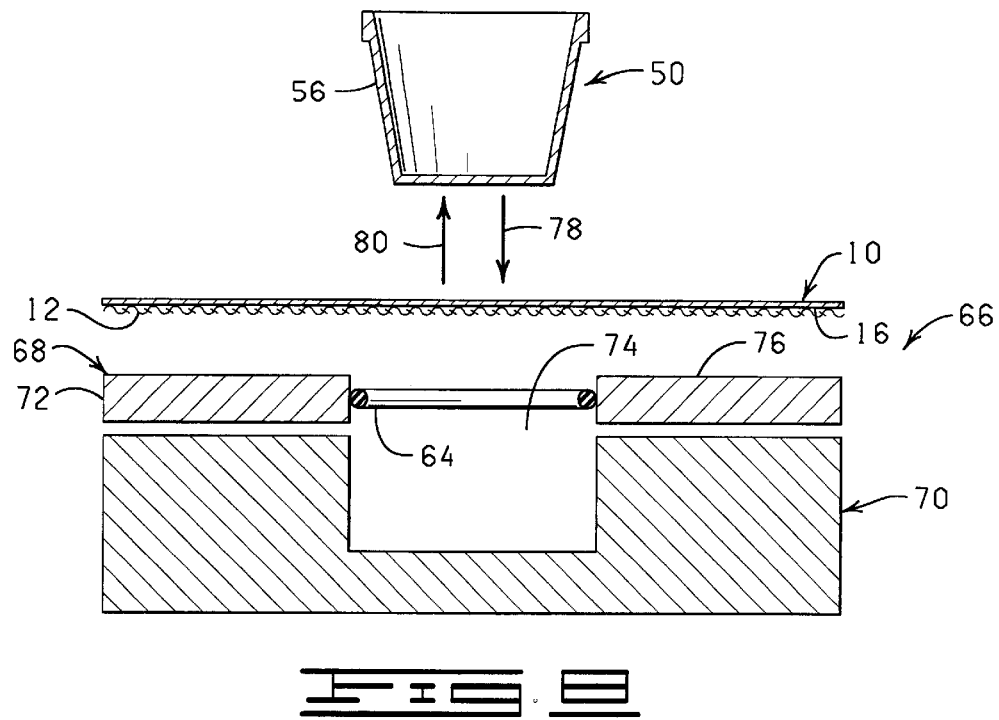
FIG. 8 is a cross-sectional view of a flower pot cover former and band applicator apparatus having the sheet of polymeric material having the texture and/or appearance simulating the texture and/or appearance of cloth on a surface thereof of FIG. 1 disposed above an opening of the flower pot cover former and band applicator and having a flower pot disposed above the sheet of polymeric material having the texture and/or appearance simulating the texture and/or appearance of cloth on a surface thereof.

Referring now to FIG. 8, a flower pot cover former and band applicator apparatus 66 for forming the sheet of polymeric material 10 having the texture and/or appearance 12 simulating the texture and/or appearance of cloth into the decorative cover 61 for the flower pot 50 of FIG. 7 is illustrated. The flower pot cover former and band applicator apparatus 66 comprises a band applicator 68 and a flower pot cover former 70. The flower pot cover former and band applicator apparatus 66 has a support platform 72 with an opening 74 formed therein. A band, such as elastic band 64, is disposed circumferentially about the opening 74 in the support platform 72.

The lower surface 16 of the sheet of polymeric material 10 (which has been modified to provide the sheet of polymeric material 10 with a textured or matted surface simulating cloth) is positioned on an upper surface 76 on the support platform 72 such that the sheet of polymeric material 10 is positioned over the opening 74 in the support platform 72. The flower pot 50 is positioned above the sheet of polymeric material 10 and is moved in a direction 78 into the opening 74 of the flower pot cover former and band applicator apparatus 66. As the flower pot 50 is moved into the opening 74, the sheet of polymeric material 10 is pressed about the outer peripheral surface 56 of the flower pot 50, thereby forming the decorative cover 63 (FIG. 7) about the flower pot 50. The decorative cover 63 (which has the texture and/or appearance 12 simulating the texture and/or appearance of cloth) is then secured about the flower pot 50 by the elastic band 64. The flower pot 50 having the decorative cover 63 secured thereto is then moved in a direction 80 out of the opening 74 in the support platform 72.

The elastic band 64 can be applied manually or automatically such as by the method shown in U.S. Pat. No. 5,105,599 issued Apr. 21, 1992 to Weder, entitled "Means For Securing A Decorative Cover About A Flower Pot", the specification of which is hereby expressly incorporated herein by reference. The band 64 can also be applied as a tie using a method such as described in "Single Station Covering and Fastening System", U.S. Pat. No. 5,609,009 issued to Weder et al on Mar. 11, 1997, the specification of which is hereby expressly incorporated herein by reference. The sheet of polymeric material 10 having the texture and/or appearance 12 simulating the texture and/or appearance of cloth can also be applied automatically about the flower pot 50, for example, by methods shown in U.S. Pat. Nos. 4,733,521 and 5,291,721, both of which are hereby expressly incorporated herein by reference.

Instead of securing the decorative cover 63 about the flower pot 50 via the band 64, the decorative cover 63 formed from the sheet of polymeric material 10 having the texture and/or appearance 12 simulating the texture and/or appearance of cloth may be secured to the flower pot 50 by the use of one or more bonding materials. For example, the upper surface 14 of the sheet of polymeric material 10 may have a bonding material such as the bonding material 27 disposed upon a portion thereof. When the sheet of polymeric material 10 is disposed about the flower pot 50, at least a portion of the upper surface 14 of the sheet of polymeric material 10 contacts the outer peripheral surface 56 of the flower pot 50 and is thereby bonded and held about the flower pot 50 via the bonding material.

The bonding material may cover a portion of the upper surface 14 of the sheet of polymeric material 10, or the bonding material may entirely cover the upper surface 14 of the sheet of polymeric material 10. The bonding material may be disposed on the upper surface 14 of the sheet of polymeric material 10 in the form of a strip or in the form of spaced-apart spots. One method for disposing a bonding material on the sheet of polymeric material 10 is described in U.S. Pat. No. 5,111,637, entitled "Method For Wrapping A Floral Grouping", issued to Weder et al on May 12, 1992, the specification of which is hereby expressly incorporated herein by reference.

The term "bonding material" when used herein can mean an adhesive, frequently a pressure sensitive adhesive, a cohesive or any adhesive/cohesive combination having adhesive qualities (i.e., qualities of adhesion or adhesion/cohesion, respectively) sufficient to cause the attachment of a portion of the sheet of polymeric material 10 to itself, to a floral grouping 34, or to a flower pot 50. Since the bonding material may comprise either an adhesive or an adhesive/cohesive combination, it will be appreciated that both adhesives and cohesives are known in the art and are commercially available. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonically sealable and vibratory sealable. The term "bonding material" when used herein also means a heat sealing lacquer or hot melt material which may be applied to the material and, in this instance, heat, sound waves, or vibrations, also must be applied to effect the sealing.

The term "bonding material" when used herein also includes any type of material or thing which can be used to effect the bonding or connecting of the two adjacent portions of the sheet of polymeric material 10 to effect the connection or bonding described herein. The term "bonding material" may also include ties, labels, bands, ribbons, strings, tapes (including single or double-sided adhesive tapes), staples or combinations thereof. Some of the bonding materials would secure the ends of the material while other bonding materials may bind the circumference of a cover, or a sleeve, or, alternatively and/or in addition, the bonding materials would secure overlapping folds in the material and/or sleeve. Another way to secure the cover and/or sleeve is to heat seal the ends of the material to another portion of the material. One way to do this is to contact the ends with an iron of sufficient heat to heat seal the material.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also includes any heat or chemically shrinkable material, and static electrical or other electrical materials, chemical welding materials, magnetic materials, mechanical or barb-type fastening materials or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

Description of FIGS. 9A–12

Figure 10:
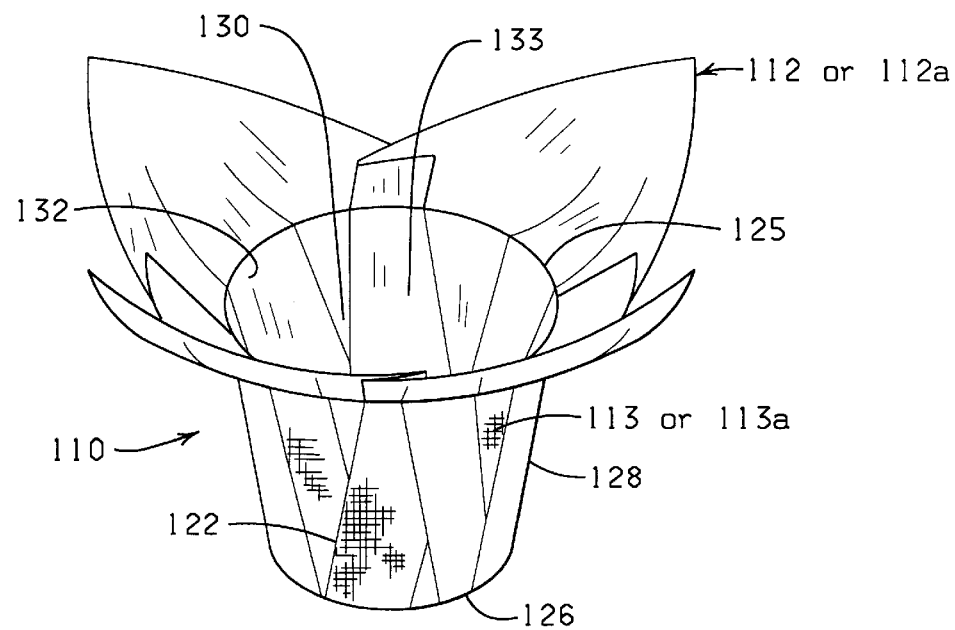
FIG. 10 is a perspective view of a decorative preformed flower pot cover formed from a sheet of polymeric material having a texture and/or appearance simulating the texture and/or appearance of cloth on a surface thereof similar to the sheet of polymeric material of FIG. 1, the sheet of expanded core polymeric film of FIG. 9A, or the laminated sheet of material of FIG. 9B.
Figure 11:
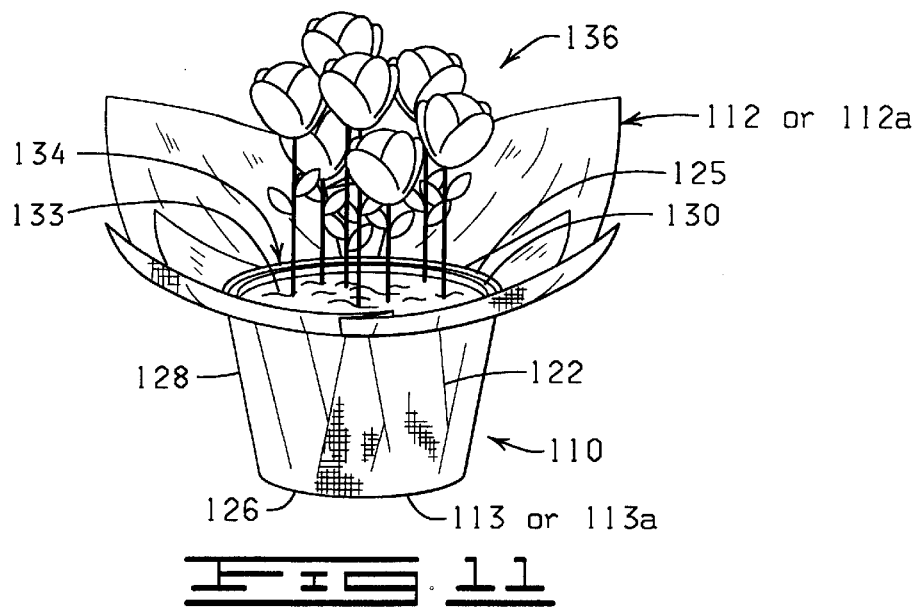
FIG. 11 is a perspective view of the decorative preformed flower pot cover of FIG. 10 having a flower pot disposed therein.

Referring now to FIGS. 10 and 11, a decorative preformed flower pot cover 110 is illustrated as being constructed from a sheet of flexible material 112 having a texture and/or appearance 113 simulating the texture and/or appearance of cloth (FIG. 9A) or a flexible laminated sheet of material 112a having a texture and/or appearance 113a simulating the texture and/or appearance of cloth (FIG. 9B). In the embodiment shown in FIG. 9A, the sheet of flexible material 112 used in the construction of the preformed flower pot cover 110 comprises a sheet of expanded core polymeric film 114 having an upper surface 116, a lower surface 118 and a thickness in the range of from about 0.5 mil to about 10 mil, more desirably in the range of from about 0.6 mil to about 1.25 mil, and a coating of an acrylic heat sealable lacquer 120 disposed on at least one of the upper and lower surfaces 116 and 118, respectively, of the sheet of expanded core polymeric film 114. In FIG. 9A, the acrylic heat sealable lacquer 120 is shown as being disposed on the lower surface 118 of the sheet of flexible material 112. It should be understood, however, that the sheet of flexible material 112 is not limited to being the sheet of expanded core polymeric film 114 having the texture and/or appearance 113 simulating the texture and/or appearance of cloth; rather, the sheet of flexible material 112 can be any flexible polymeric material (such as the sheet of polymeric material 10 herein before described) or a flexible laminated material (such as will be described herein after with reference to FIG. 9B) which can be modified or textured so that at least one surface of such polymeric material or laminated material is provided with a finish or texture simulating cloth.

As previously stated, the modification of the sheet of expanded core polymeric film 114 to provide the sheet of flexible material 112 with the desired matte or textured finish 113 can be accomplished by printing a desired pattern on the sheet of expanded core polymeric film 114 and thereafter laminating a matte material, such as a translucent polymeric film, over the printed pattern. To further enhance the texture and/or appearance 113 simulating the texture and/or appearance of cloth, the matte material may or may not have a plurality of spatially disposed holes extending therethrough. A matte or textured finish 113 can also be produced by printing a sheet of expanded core polymeric film 114 with a matted (i.e. dull finish) ink, by lacquering at least one surface of the sheet of expanded core polymeric film 114 with a dull finish lacquer or a matting lacquer, by embossing the sheet of expanded core polymeric film 114 to provide an embossed pattern simulating the weave or texture of cloth, or by embossing and printing the sheet of expanded core polymeric material to provide embossed and printed patterns wherein the embossed and printed patterns may be in registry, out of registry, or wherein a portion of the embossed and printed patterns are in registry and a portion of the embossed and printed patterns are out of registry. In addition, a matte or textured finish capable a providing the sheet of flexible polymeric film 114 with the texture and/or appearance 113 simulating the texture and/or appearance of cloth can be achieved by extruding a polymeric resin onto a matted or textured chill roll to produce the sheet of expanded core polymeric film 114, by laminating a second sheet of material to the sheet of expanded core polymeric film 114, or by applying a foamable lacquer or foamable ink to the sheet of expanded core polymeric film 114.

When the sheet of flexible material 112 is formed into the decorative preformed flower pot cover 110 (FIGS. 10 and 11), a plurality of overlapping folds 122 are formed, and at least a portion of the overlapping folds 122 are connected to adjacently disposed portions of the decorative preformed flower pot cover 110 via the acrylic heat sealable lacquer 120.

As shown in FIGS. 10 and 11, the decorative preformed pot cover 110 has an upper end 125, a lower end 126, and an outer peripheral surface 128. An opening 130 intersects the upper end 125, forming an inner peripheral surface 132 which defines and encompasses a retaining space 133 within which a flower pot 134 containing a floral grouping 136 may be disposed in a manner well known in the art.

In another embodiment, a laminated sheet of flexible laminated material 112a (FIG. 9B) is used in the construction of the decorative preformed flower pot cover 110. The laminated sheet of flexible laminated material 112a comprises a first sheet of material 114a having an upper surface 116a and a lower surface 118a, and a second sheet of material 120a laminated to at least a portion of at least one of the upper and lower surfaces 116a and 118a, respectively, of the first sheet of material 114a. At least one surface of the first sheet of material 114a or the second sheet of material 120a is modified to provide the laminated sheet of flexible laminated material 112a with the desired texture and/or appearance 113a simulating the texture and/or appearance of cloth. The sheet of flexible laminated material 112a having the texture and/or appearance 113a simulating the texture and/or appearance of cloth can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) with a sheet of paper, metallized foil and the like wherein at least one surface of the laminated material is textured or modified to simulate the weave or texture of cloth.

The first sheet of material 114a desirably has a thickness of from about 0.5 mil to about 10 mil, and more desirably from about 0.6 mil to about 1.25 mil, and the second sheet of material 120a desirably has a thickness of from about 0.5 mil to about 10 mil, and more desirably from about 0.6 mil to about 1.25 mil. The second sheet or material 120a is desirably laminated to the first sheet of material 114a with a colored adhesive so as to impart a desired color to the laminated sheet of flexible material 112a. While the thickness of the laminated sheet of flexible material 112a can vary widely and will generally depend on the thickness of the first sheet of material 114a and the thickness of the second sheet of material 120a, desirable results can be obtained where the laminated sheet of flexible material 112a has a thickness in the range of from about 1 mil to about 20 mil, and more desirably from about 1.2 mil to about 2.5 mil.

As previously stated, the decorative preformed flower pot cover 110 may be constructed from the sheet of material 10 (FIG. 1), or the sheet of flexible material 112 (FIG. 9A), or the sheet of flexible laminated material 112a (FIG. 9B). The decorative preformed flower pot cover 110 so formed will have a plurality of overlapping folds 122 formed therein, at least a portion thereof being connected. If desired, the decorative preformed flower pot cover 110 can be formed of a plurality of sheets of the same and/or different types of material. The method and apparatus employed to form the decorative preformed flower pot cover 110 is substantially identical whether one uses one or more sheets of polymeric material 10 (FIG. 1), one or more sheets of flexible material 112 (FIG. 9A), or one or more sheets of flexible laminated material 112a (FIG. 9B) or a combination of such sheets of material. Thus, only the formation of the decorative preformed flower pot cover 110 using a sheet of flexible material 112 of FIG. 9 will be described in detail hereinafter with reference to FIG. 12.

Figure 12:
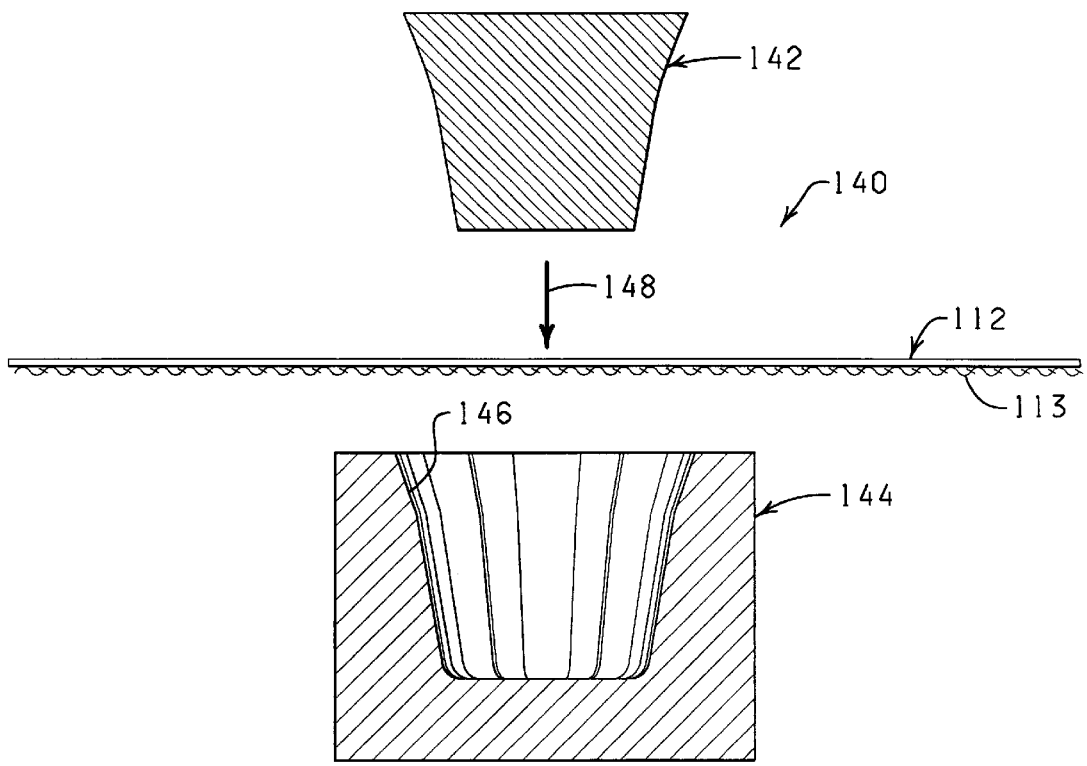
FIG. 12 is a diagrammatic, cross-sectional view of a male and female mold having a sheet of the expanded core polymeric film of FIG. 9A disposed therebetween for forming the decorative preformed flower pot cover of FIG. 10.

The decorative preformed flower pot cover 110 may be formed using a conventional mold system 140 comprising a male mold 142 and a female mold 144 having a mold cavity 146 for matingly receiving the male mold 142 (FIG. 12). The sheet of flexible material 112 having the texture and/or appearance 113 simulating the texture and/or appearance of cloth is positioned between the male and female molds 142 and 144, respectively. Movement of the male mold 142 in the direction 148 into the mold cavity 146 forces the sheet of flexible material 112 to be disposed about the portion of the male mold 142 disposed in the mold cavity 146 of the female mold 144 and thereby forms the sheet of material 112 into the preformed decorative flower pot cover 110 (FIGS. 10 and 11). Further, in accordance with the present invention, the decorative preformed flower pot cover 110 constructed from the materials described herein above, may have a bonding material disposed upon a portion thereof.

Methods for forming such preformed decorative pot covers are well known in the art. Two methods of forming such covers are described in U.S. Pat. Nos. 4,773,182 and 5,291,721, each of which is expressly incorporated herein by reference.

Description of FIGS. 13–19

Shown in FIG. 13 is a decorative cover designated therein by the general reference numeral 160 which comprises a flexible bag or sleeve 162 of unitary construction having a texture and/or appearance 163 simulating the texture and/or appearance of cloth in accordance with the present invention. The sleeve 162 may be used as a decorative cover 160 for a floral grouping or a flower pot. The sleeve 162 initially comprises a flexible flat collapsed piece of material which is openable in the form of a tube or sleeve. Such sleeves are well known in the floral industry. Further, in accordance with the present invention, the decorative cover 160 can be constructed of the polymeric material 10 (FIG. 1), the flexible material 112 (FIG. 9A), or the flexible laminated material 112a (FIG. 9B), whereby at least a portion of one surface, preferably an outer peripheral surface 164 of the sleeve 162, has been modified to provide the sleeve 162 with the texture and/or appearance 163 simulating the texture and/or appearance of cloth, as previously described herein. The sleeve 162 has an upper end 166, a lower end 168 and the outer peripheral surface 164. The sleeve 162 may be tapered outwardly from the lower end 168 toward a larger diameter at its upper end 166. In its flattened state the sleeve 162 generally has an overall trapezoidal or modified trapezoidal shape, and when opened is substantially frusto-conical to coniform. It will be appreciated, however, that the sleeve 162 may comprise variations on the aforementioned shapes or may comprise significantly altered shapes such as square or rectangular, wherein the sleeve 162 when opened has a cylindrical form, as long as the sleeve 162 functions in accordance with the present invention in the manner described herein. The sleeve 162 (or any other sleeve disclosed herein) may have an angular or contoured shape.

The sleeve 162 has an opening 170 at the upper end 166 and may be open at the lower end 168, or closed with a bottom at the lower end 168. The sleeve 162 also has an inner peripheral surface 172 which, when the sleeve 162 is opened, defines and encompasses an inner retaining space 174. When the lower end 168 of the sleeve 162 has a closed lower end 168, a portion of the lower end 168 may be inwardly folded to form one or more gussets (not shown) for allowing the lower portion of the inner retaining space 174 to be expandable, for example, for receiving the circular bottom of a pot or growing medium.

The sleeve 162 is generally frusto-conically shaped, but the sleeve 162 may be, by way of example but not by way of limitation, cylindrical, frusto-conical, a combination of both frusto-conical and cylindrical, or any other shape, as long as the sleeve 162 functions as described hereinabove. Further, the sleeve 162 may comprise any shape, whether geometric, non-geometric, asymmetrical and/or fanciful as long as it functions in accordance with the present invention. The sleeve 162 may also be equipped with drain holes (if having a closed bottom) or side ventilation holes (not shown), or can be made from gas permeable or impermeable materials.

The material from which the sleeve 162 is constructed is the same as previously described above for the sheet of polymeric material 10 having the texture and/or appearance 12 simulating the texture and/or appearance of cloth, or the sheet of flexible material 112 or 112a having the texture and/or appearance 113 or 113a simulating the texture and/or appearance of cloth. Any thickness of material may be utilized in accordance with the present invention as long as the sleeve 162 may be formed as described herein, is provided with the texture and/or appearance 163 simulating the texture and/or appearance of cloth, and as long as the formed sleeve 162 may contain at least a portion of a flower pot or a floral grouping, as described herein. Additionally, an insulating material such as bubble film, preferably as one of two or more layers, can be utilized in order to provide additional protection for the item, such as a floral grouping, contained therein.

In FIG. 14 the sleeve 162 is illustrated as having the texture and/or appearance 163 simulating the texture and/or appearance of cloth provided on the outer peripheral surface 164 of the sleeve 162. A floral grouping 176 is disposed within the inner retaining space 174 of the sleeve 162. Generally, an upper or bloom portion 178 of the floral grouping 176 is disposed substantially adjacent the opening 170 of the sleeve 162 and a lower or stem portion 180 of the floral grouping 176 is disposed substantially adjacent the lower end 168 of the sleeve 162. The bloom portion 178 and/or the stem portion 180 of the floral grouping 176 may be disposed within the sleeve 162, or a portion of the bloom portion 178 and/or the stem portion 180 of the floral grouping 176 may extend beyond the upper end 166 and/or lower end 168, respectively, of the sleeve 162 and be exposed. Alternatively, either end of the sleeve 162 may be closed about the floral grouping 176. Generally, a portion of the sleeve 162 is tightened about a portion of the stem portion 180 of the floral grouping 176 for holding the decorative cover 160 about the floral grouping 176. For example, the sleeve 162 may be held by a tie 182 tied about the sleeve 162 such as is shown in FIG. 14.

Other methods and materials for binding the sleeve 162 may be employed such as the bonding methods and materials described elsewhere herein. For example, as shown in FIG. 15, a decorative cover 160a is shown which comprises a sleeve 162a having the texture and/or appearance 163a simulating the texture and/or appearance of cloth and a cinching tab 184 having a bonding material 186 disposed upon a surface thereof. The cinching tab 184 can be used to gather portions of the sleeve 162a together about the stem portion 180 of the floral grouping 176 as shown in FIG. 16 for holding the sleeve 162a tightly about the floral grouping 176.

Similarly, it may generally be desired to use the sleeve 162 as a decorative cover for a flower pot (not shown). The flower pot will generally contain a botanical item or plant. The flower pot can be deposited into the open sleeve 162 in a manner well known in the art, such as manually wherein the sleeve 162 is opened by hand and the flower pot deposited therein.

As noted above, a bonding material may be disposed on a portion of the sleeve 162 or any sleeve described herein to assist in holding the sleeve 162 to the flower pot when the flower pot is disposed within the sleeve 162 or to assist in closing the upper end 166 of the sleeve 162 or adhering the sleeve 162 to the flower pot after the flower pot has been disposed therein, as will be discussed in further detail below.

It will be understood that the bonding material, if present, may be disposed as a strip or block on a surface of the sleeve 162. The bonding material may also be disposed upon either the outer peripheral surface 164 or the inner peripheral surface 172 of the sleeve 162, as well as upon the flower pot. Further, the bonding material may be disposed as spots of bonding material, or in any other geometric, non-geometric, asymmetric, or fanciful form, and in any pattern, including covering either the entire inner peripheral surface 172 and/or outer peripheral surface 164 of the sleeve 162 and/or the flower pot. The bonding material may be covered by a cover or release strip which can be removed prior to the use of the sleeve 162 or flower pot. The bonding material can be applied by methods known to those of ordinary skill in their art. One method for disposing a bonding material, in this case an adhesive, is described in U.S. Pat. No. 5,111,637 issued to Weder et al on May 12, 1992, entitled "Method For Wrapping A Floral Grouping", the specification of which is hereby expressly incorporated herein by reference.

As noted above, a bonding material may be disposed on at least a portion of the inner peripheral surface 172 of the sleeve 162 (or any other sleeve described herein), or, alternatively, the bonding material may be disposed on the outer peripheral surface of a flower pot contained within the sleeve 162, while the sleeve 162 may be free of the bonding material. In a further alternative, the bonding material may be disposed both on at least a portion of the flower pot as well as upon at least a portion of the inner peripheral surface 172 of the sleeve 162. In addition, a portion of the bonding material may also be disposed on the outer peripheral surface 164 of the sleeve 162 as well. It will be understood that the bonding material may be disposed in a solid section of bonding material. The bonding material, when present, is disposed on the sleeve 162 and/or flower pot by any method known in the art.

Certain versions of sleeves described herein may be used in combination with a preformed pot cover. For example, a preformed pot cover may be applied to a flower pot, then the covered flower pot wrapped or disposed within a sleeve. Either the cover or the sleeve, or both, may have a texture and/or appearance simulating the texture and/or appearance of cloth. Examples of sleeves which may be used in this invention are shown in the specification of U.S. Pat. No. 5,625,979 entitled "Sleeve Having A Detachable Portion Forming A Skirt And Method" issued to Weder on May 6, 1997, the specification of which is expressly incorporated herein by reference in its entirety. Equipment and devices for forming sleeves are commercially available and well known in the art.

Shown in FIGS. 17–19 is another embodiment of a decorative cover 160b comprising a sleeve 162b having the texture and/or appearance 163b simulating the texture and/or appearance of cloth and constructed from either the polymeric material 10 having the texture and/or appearance 12 simulating the texture and/or appearance of cloth, the flexible material 112 having a texture and/or appearance simulating the texture and/or appearance of cloth, or the flexible laminated material 112a having the texture and/or appearance 113a in accordance with the present invention. The sleeve 162b has a "detaching" element 165 in predetermined areas for detaching a portion of the sleeve 162b. The sleeve 162b generally initially comprises a flexible flat collapsed piece of material which is openable in the form of a tube or sleeve. The sleeve 162b is constructed of the same material and in the same way as described previously herein and may be described exactly the same as the other sleeves described herein except for the additional elements described hereinafter.

The sleeve 162b has an upper end 166b, a lower end 168b, and an outer peripheral surface 164b. The sleeve 162b has an opening 170b at the upper end 166b thereof, and the sleeve 162b may be open at the lower end 168b or closed with a bottom at the lower end 168b. In a flattened state, the sleeve 162b has a first side 171 and a second side 173. The sleeve 162b also has an inner peripheral surface 172b which, when the sleeve 162b is opened, defines and encompasses an inner retaining space 174b as shown in FIG. 18. When the lower end 168b of the sleeve 162b has a closed bottom, a portion of the lower end 168b may be inwardly folded to form one or more gussets (not shown) for permitting a circular bottom of an object such as a potted plant 176b to be disposed in the inner retaining space 174b of the sleeve 162b.

As shown in FIGS. 17 and 18, the sleeve 162b is demarcated into an upper portion 188 and a lower portion 190. The lower portion 190 of the sleeve 162b is generally sized to contain the flower pot 176b. The upper portion 188 of the sleeve 162b is sized to substantially surround and encompass a plant 192 contained in the flower pot 176b disposed within the lower portion 190 of the sleeve 162b. The sleeve 162b is demarcated into the upper portion 188 and the lower portion 190 by the detaching element 165 for enabling the detachment of the upper portion 188 of the sleeve 162b from the lower portion 190 of the sleeve 162b. In the present version, the detaching element 165 includes a plurality of generally laterally-oriented or alternatingly diagonally-oriented perforations 194 which extend circumferentially across the outer peripheral surface 164b of the sleeve 162b. The detaching element 165 may further include a plurality of vertical perforations 200 disposed in the upper portion 188 of the sleeve 162b for facilitating removal of the upper portion 188 from the lower portion 190 and which are disposed more or less vertically therein extending between the plurality of perforations 194 and the upper end 166b of the sleeve 162b.

In the embodiment shown in FIGS. 17 and 18, the lower portion 190 of the sleeve 162b further comprises a base portion 196 and a skirt portion 198. The base portion 196 comprises that part of the lower portion 190 which, when the flower pot 176b is placed into the lower portion 190, is substantially adjacent to and surrounds an outer peripheral surface 199 of the flower pot 176b. The skirt portion 198 is attached to the base portion 196 and extends therefrom. The skirt portion 198 comprises that part of the lower portion 190 which extends beyond an open upper end 201 of the flower pot 176b and surrounds at least a portion of the plant 192 contained within the flower pot 176b and which is left to freely extend at an angle, inwardly or outwardly, from the base portion 196 when the upper portion 188 of the sleeve 162b is detached from the lower portion 190 of the sleeve 162b by actuation of the detaching element 165.

In the intact sleeve 162b, the skirt portion 198 has an upper peripheral edge congruent with the plurality of perforations 194 of the detaching element 165 which is connected to a lower peripheral edge of the upper portion 188 of the sleeve 162b, which is also congruent with the plurality of perforations 194 of the detaching element 165. In FIGS. 17 and 18, the upper peripheral edge of the skirt portion 198 is congruent with the plurality of alternatingly diagonally-oriented lines of perforations which together form a zig-zag and comprise a portion of the detaching element 165.

The upper portion 188 of the sleeve 162b is thereby separable from the lower portion 190 of the sleeve 162b by tearing the upper portion 188 along the perforations 194 and 200 of the detaching element 165, thereby separating the upper portion 188 from the lower portion 190 of the sleeve 162b. The lower portion 190 of the sleeve 162b remains disposed as the base portion 196 about the flower pot 176b and as the skirt portion 198 about the plant 192 forming a decorative cover 202 as shown in FIG. 19 which substantially surrounds and encompasses the flower pot 176b and the plant 192 contained therein. As shown in FIG. 19, the skirt portion 198 is provided with an angular upper edge 204 positioned adjacent a portion of the plant 192 disposed in the flower pot 176b, while the base portion 196 remains in a position surrounding the floral grouping 176b. At least a portion of the base portion 196 of the sleeve 162b is modified to provide such portion of the sleeve 162b with a texture and/or appearance 163b simulating the texture and/or appearance of cloth.

As shown in FIGS. 17 and 18, the base portion 196 of the lower portion 190 and the upper portion 188 of the sleeve 162b may be provided with the texture and/or appearance 163b simulating the texture and/or appearance of cloth. However, it is to be understood that the base portion 196 alone, the skirt portion 198 alone, the upper portion 188 alone, or any combination of the base portion 196, the skirt portion 198 and the upper portion 188 of the sleeve 162b may be provided with the texture and/or appearance 163b simulating the texture and/or appearance of cloth. For example, the lower portion 190 of the sleeve 162b, including both the base and skirt portions 196 and 198, may be modified to provide the lower portion 190 of the sleeve 162b with the texture and/or appearance 163b simulating the texture and/or appearance of cloth, while the upper portion 188 is left unmodified or is printed with a design. When the upper portion 188 is detached, the lower portion 190 of the sleeve 162b remains about the flower pot 176b and thereby forms a decorative cover 202 about the flower pot 176b which has the appearance of cloth.

"Detaching element" as used herein, refers to any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith.

In a general method of use of the sleeve 162b as the decorative cover 202 for the flower pot 176b, an operator provides the sleeve 162b and the flower pot 176b having the plant 192 disposed in a growing medium contained within the flower pot 176b. The operator then opens the sleeve 162b at its upper end 166b and assures that the opening 170b therein is in an open condition and that the inner peripheral surface 172b of the sleeve 162b is somewhat expanded outward as well, as shown in FIG. 18. The operator then manually or automatically disposes the flower pot 176b into the opening 170b in the sleeve 162b, the flower pot 176b being disposed generally through the upper portion 188 of the sleeve 162b into generally the lower portion 190 of the sleeve 162b. The flower pot 176b remains in the lower portion 190 of the sleeve 162b, thereby permitting the sleeve 162b to substantially surround and tightly encompass the flower pot 176b. It will be understood that alternatively, the sleeve 162b may be provided with an extension (not shown), and the sleeve 162b may be disposed on rods or wickets, and the flower pot 176b may be disposed in the sleeve 162b either before or after the sleeve 162b has been removed from the wickets.

Description of FIGS. 20A–20C

Referring now to FIG. 20A, designated generally by the reference numeral 210 is a polymeric ribbon material having a matte or textured finish 212 simulating the texture and/or appearance of cloth for forming decorative bows and for wrapping items. That is, at least one surface of a web of polymeric material (not shown) is modified to provide the matte or textured finish 212 simulating the texture and/or appearance of cloth. The modification of the web of polymeric material (not shown) to provide the polymeric ribbon material 210 with the matte or textured finish 212 simulating the texture and/or appearance of cloth can be accomplished in several ways. For example, the polymeric ribbon material 210 having the matte or textured finish 212 simulating the texture and/or appearance of cloth can be produced by printing a web of polymeric material with a matted (i.e. dull finish) ink, by lacquering at least one surface of the sheet of polymeric material with a dull finish lacquer or a matting lacquer, by embossing the sheet of polymeric material to provide an embossed pattern simulating the weave or texture of cloth, by flocking the sheet of polymeric material, by application of a foamable lacquer or foamable ink to the sheet of polymeric material, or by embossing and printing the sheet of polymeric material to provide embossed and printed patterns wherein the embossed and printed patterns may be in registry, out of registry, or wherein a portion of the embossed and printed patterns are in registry and a portion of the embossed and printed patterns are out of registry. In addition, the matte or textured finish 212 capable of providing the sheet of polymeric material 210 with a texture and/or appearance simulating the texture and/or appearance of cloth can be achieved by extruding a polymeric resin onto a matted or textured chill roll. Thereafter, the web of material having a texture and/or appearance simulating the texture and/or appearance of cloth can be cut in a conventional manner to provide the polymeric ribbon material 210 having the matte or textured finish 212 simulating the texture and/or appearance of cloth.

Any polymeric material capable of being textured or otherwise modified to provide the polymeric material with the matte or textured finish 212 simulating the texture and/or appearance of cloth can be employed in the formulation of the polymeric ribbon material 210. For example, the polymeric material employed to produce the polymeric ribbon material 210 can be the polymeric material 10 (FIG. 1), i.e. a polypropylene film having a thickness of from about 0.1 mil to about 30 mil, and more desirably of from about 0.5 mil to about 10 mil, or the sheet of flexible material 112, i.e., an expanded core polymeric film having a thickness of from about 0.5 mil to about 10 mil.

Referring now to FIG. 20B, designated generally by the reference numeral 220 is another embodiment of a polymeric ribbon material having a matte or textured finish 221 simulating the texture and/or appearance of cloth and utilized for forming decorative bows and for wrapping items. The polymeric ribbon material 220 having the matte or textured finish 221 simulating the texture and/or appearance of cloth is a laminated material comprising a first web or sheet of material 222 having a thickness of from about 0.5 mil to about 10 mil, and more desirably from about 0.6 mil to about 1.25 mil, and a second web or sheet of material 224 having a thickness of from about 0.5 mil to about 10 mil, and more desirably from about 0.6 mil to about 1.25 mil. The laminated material having the matte or textured finish 221 simulating the texture and/or appearance of cloth can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) with a sheet of paper, metallized foil and the like wherein at least one surface of the laminated material is textured or modified to simulate the weave or texture of cloth. The second web or sheet of material 224 is desirably laminated to the first web or sheet of material 222 with a colored adhesive so as to impart a desired color to the polymeric ribbon material 220. If desired the polymeric ribbon material 220 may be treated or otherwise processed to provide the polymeric ribbon material 220 with the matte or textured finish 221 simulating the weave or knit of cloth so that the polymeric ribbon material 220 has a texture and/or appearance simulating the texture and/or appearance of cloth similar to the polymeric ribbon material 210 hereinbefore described with reference to FIG. 20A. That is, a matte or textured finish simulating cloth can be printed on the first web or sheet of material 222, and thereafter the second web or sheet of material 224 (which in this case is desirably a matte material of translucent polymeric film) is laminated to the first web or sheet of material 222 to provide the polymeric ribbon material 220 with the matte or textured finish 221 simulating the texture and/or appearance of cloth. To further enhance the texture and/or appearance simulating the texture and/or appearance of cloth of the polymeric ribbon material 220, the second web or sheet of material 224 may or may not have a plurality of spatially disposed holes extending therethrough. The matte or textured finish 221 can be produced by printing at least one of the first and second webs or sheets of material 222 and 224 with a matted (i.e. dull finish) ink, by lacquering at least one surface of at least one of the first and second webs or sheets of material 222 and 224 with a dull finish lacquer or a matting lacquer, by flocking at least one of the first and second webs or sheets of material 222 and 224, by application of a foamable lacquer or foamable ink to at least one of the first and second webs or sheets of material 222 and 224, by embossing at least one of the first and second webs or sheets of material 222 and 224 to provide an embossed pattern simulating the weave or texture of cloth, or by embossing and printing at least one of the first and second webs or sheets of material 222 and 224 to provide embossed and printed patterns wherein the embossed and printed patterns may be in registry, out of registry, or wherein a portion of the embossed and printed patterns are in registry and a portion of the embossed and printed patterns are out of registry. In addition, the matte or textured finish 221 capable of providing the polymeric ribbon material 220 with a texture and/or appearance simulating the texture and/or appearance of cloth can be achieved by extruding the resin used to produce one of the first and second webs or sheets of material 222 and 224 onto a matted or textured chill roll.

Referring now to FIG. 20C, designated generally by the reference numeral 230 is another embodiment of a polymeric ribbon material for forming decorative bows and for wrapping items. The polymeric ribbon material 230 has a matte or textured finish 231 simulating the texture and/or appearance of cloth and comprises a polymeric film 232 having an upper surface 234, a lower surface 236 and a thickness in the range of from about 0.1 mil to about 30 mil, and more desirably, from about 0.5 mil to about 10 mil. An acrylic heat sealable lacquer 238 is applied to at least one of the upper and lower surfaces 234 and 236 of the polymeric film 232, such as the lower surface 236 of the polymeric film 232, and at least one of the upper surface 234 and the lower surface 236 of the polymeric film 232 is modified to provide the polymeric ribbon material 230 with the matte or textured finish 231 simulating the appearance of cloth. The modification of the polymeric film 232 to provide the polymeric ribbon material 230 with the matte or textured finish 231 simulating the texture and/or appearance of cloth can be accomplished in several ways. For example, the polymeric ribbon material 230 having the matte or textured finish 231 can be produced by printing a web of polymeric material with a matted (i.e. dull finish) ink, by lacquering at least one of the upper surface 234 and the lower surface 236 of the polymeric film 232 with a dull finish lacquer or a matting lacquer, by flocking the polymeric film 232, by application of a foamable lacquer or foamable ink to the polymeric film 232, by embossing the polymeric film 232 to provide an embossed pattern simulating the weave or texture of cloth, or by embossing and printing the polymeric film 232 to provide embossed and printed patterns wherein the embossed and printed patterns may be in registry, out of registry or wherein a portion of the embossed and printed patterns are in registry and a portion of the embossed and printed patterns are out of registry. In addition, the matte or textured finish 231 capable of providing the polymeric film 232 with a texture and/or appearance simulating the texture and/or appearance of cloth can be achieved by extruding a polymeric resin onto a matted or textured chill roll. Thereafter, the polymeric film 232 having the matte or textured finish 231 simulating the texture and/or appearance of cloth can be cut in a conventional manner to provide the polymeric ribbon material 230.

Any polymeric film capable of being textured or otherwise modified to provide the polymeric material with a texture and/or appearance simulating the texture and/or appearance of cloth can be employed in the formulation of the polymeric ribbon material 230. For example, the polymeric film 232 employed to produce the polymeric ribbon material 230 can be polypropylene film having a thickness of from about 0.1 mil to about 30 mil, and more desirably of from about 0.5 mil to about 10 mil, or an expanded core polymeric film having a thickness of from about 0.5 mil to about 10 mil, or a laminated material having a thickness of from about 0.5 mil to about 10 mil.

Changes may be made in the construction and the operation of the various components, elements and assemblies described herein or in the steps or the sequence of steps of the methods described herein without departing from the spirit and scope of the invention as defined in the following claims.

What is claimed:

1. A sleeve for containing a flower pot having an upper end and an outer peripheral surface and having a floral grouping disposed therein, the sleeve having a closed lower end, an open upper end, an outer peripheral surface and an inner peripheral surface which, when the sleeve is open, defines and encompasses an inner retaining space, the sleeve formed of a flexible, laminated polymeric material wherein at least one polymeric material is laminated to a second material selected from the group consisting of paper and metallized foil, the flexible, laminated polymeric material having at least a portion of one surface thereof modified or textured to provide the flexible, laminated polymeric material with an appearance or texture simulating the appearance or texture of cloth so that at least a portion of the sleeve formed from the flexible, laminated polymeric material is provided with an appearance or texture simulating the appearance or texture of cloth, the sleeve comprising:

a lower portion generally sized to contain the flower pot, the lower portion comprising:
      a base portion having at least one surface thereof modified to provide such surface with a texture and/or appearance simulating the texture and/or appearance of cloth, the base portion being tapered, sized and dimensioned so that an inner peripheral surface thereof is substantially adjacent to and surrounds the outer peripheral surface of the flower pot; and
      a skirt portion attached to and extending from the base portion, the skirt portion extending beyond the upper end of the flower pot and adjacent to at least a portion of the floral grouping disposed in the flower pot when the flower pot containing the floral grouping is disposed in the sleeve; and
   an upper portion connected to the skirt portion of the lower portion and sized to substantially surround and encompass the floral grouping disposed in the flower pot, the upper portion detachable from the skirt portion of the lower portion via a plurality of angularly oriented perforations whereby, upon detachment of the upper portion from the lower portion, the skirt portion of the lower portion is provided with an angular upper edge positioned adjacent a portion of the floral grouping and the base portion remains in a position surrounding the flower pot.

2. The sleeve of claim 1 wherein at least one surface of the flexible, laminated polymeric material forming the skirt portion of the sleeve is modified so that at least one surface of the skirt portion of the sleeve is modified to provide such surface of the skirt portion of the sleeve with a texture or appearance simulating the texture or appearance of cloth.

3. The sleeve of claim 2 wherein at least a portion of the flexible, laminated polymeric material forming the upper portion of the sleeve is modified so that at least one surface of the upper portion of the sleeve is modified to provide such surface of the upper portion of the sleeve with a texture or appearance simulating the texture or appearance of cloth.

4. The sleeve of claim 1 wherein the texture or appearance simulating the texture or appearance of cloth is provided on at least one surface of the sleeve by at least one of flocking, application of a foamable lacquer and applicat7ion of a foamable ink.

* * * * *

UNITED STATES PATENT AND TRADEMARK OFFICE
CERTIFICATE OF CORRECTION

PATENT NO. : 6,720,051 B2
DATED : April 13, 2004
INVENTOR(S) : Donald E. Weder

It is certified that error appears in the above-identified patent and that said Letters Patent is hereby corrected as shown below:

Column 22,
Line 50, delete "applicat7ion" and replace with word -- application --.

Signed and Sealed this

Ninth Day of November, 2004

JON W. DUDAS
*Director of the United States Patent and Trademark Office*